US010541642B2

(12) United States Patent
Georgopapadakos et al.

(10) Patent No.: US 10,541,642 B2
(45) Date of Patent: Jan. 21, 2020

(54) SYSTEM AND METHOD FOR MOUNTING OBJECTS ON ROOFS AND SURFACES

(71) Applicant: SafeConnect Solar, Inc., Honolulu, HI (US)

(72) Inventors: Todd Georgopapadakos, Palo Alto, CA (US); Brian Cunningham, Wilbraham, MA (US); Mark Duda, Honolulu, HI (US); John Pitre, Honolulu, HI (US)

(73) Assignee: SafeConnect Solar, Inc., Honolulu, HI (US)

( * ) Notice: Subject to any disclaimer, the term of this patent is extended or adjusted under 35 U.S.C. 154(b) by 0 days.

(21) Appl. No.: 16/011,778

(22) Filed: Jun. 19, 2018

(65) Prior Publication Data

US 2018/0375462 A1 Dec. 27, 2018

Related U.S. Application Data

(60) Provisional application No. 62/523,343, filed on Jun. 22, 2017.

(51) Int. Cl.
*H02S 20/23* (2014.01)
*H02S 20/30* (2014.01)
*F24S 25/65* (2018.01)
*F24S 25/70* (2018.01)
*F24S 25/61* (2018.01)
*F24S 25/00* (2018.01)

(52) U.S. Cl.
CPC .............. *H02S 20/23* (2014.12); *F24S 25/61* (2018.05); *F24S 25/65* (2018.05); *F24S 25/70* (2018.05); *H02S 20/30* (2014.12); *F24S 2025/80* (2018.05)

(58) Field of Classification Search
CPC ........ H02S 20/23; H02S 20/30; F24S 25/632; F24S 25/20; F24S 25/61; F24S 25/70; F24S 25/65; F24S 2025/80
See application file for complete search history.

(56) References Cited

U.S. PATENT DOCUMENTS

| 9,742,188 B2 * | 8/2017 | Georgopapadakos ...................... H01L 31/02021 |
| 9,929,561 B2 * | 3/2018 | Georgopapadakos .... H02J 1/12 |
| 2015/0001963 A1 * | 1/2015 | Georgopapadakos ...................... H01L 31/02021 307/116 |

(Continued)

*Primary Examiner* — Rodney Mintz
(74) *Attorney, Agent, or Firm* — Polsinelli PC

(57) ABSTRACT

A mount for support of a component on a surface is provided. A base includes a bottom adapted to be supported on the surface, a circuit component, and a data pathway extending from the circuit component. A compressible component is mounted above the base and in electrical contact with the data pathway of the base, the compressible component having an uncompressed state in which the circuit component is not electrically accessible through the compressible component, and a compressed state in which a data pathway is formed through the compressible component such that the data pathway of the base is electrically accessible through the compressible component. The compressible component is adapted to transition from the uncompressed state to the compressed state in response to a lag bolt passing through the compressible component and base and applying sufficient downward pressure to secure the base to the surface.

21 Claims, 29 Drawing Sheets

(56) References Cited

U.S. PATENT DOCUMENTS

2015/0001964 A1* 1/2015 Duda ..................... H02J 1/12
  307/116
2017/0077710 A1* 3/2017 Duda ..................... H02J 3/46
2018/0089339 A1* 3/2018 Udell ..................... H02S 99/00

* cited by examiner

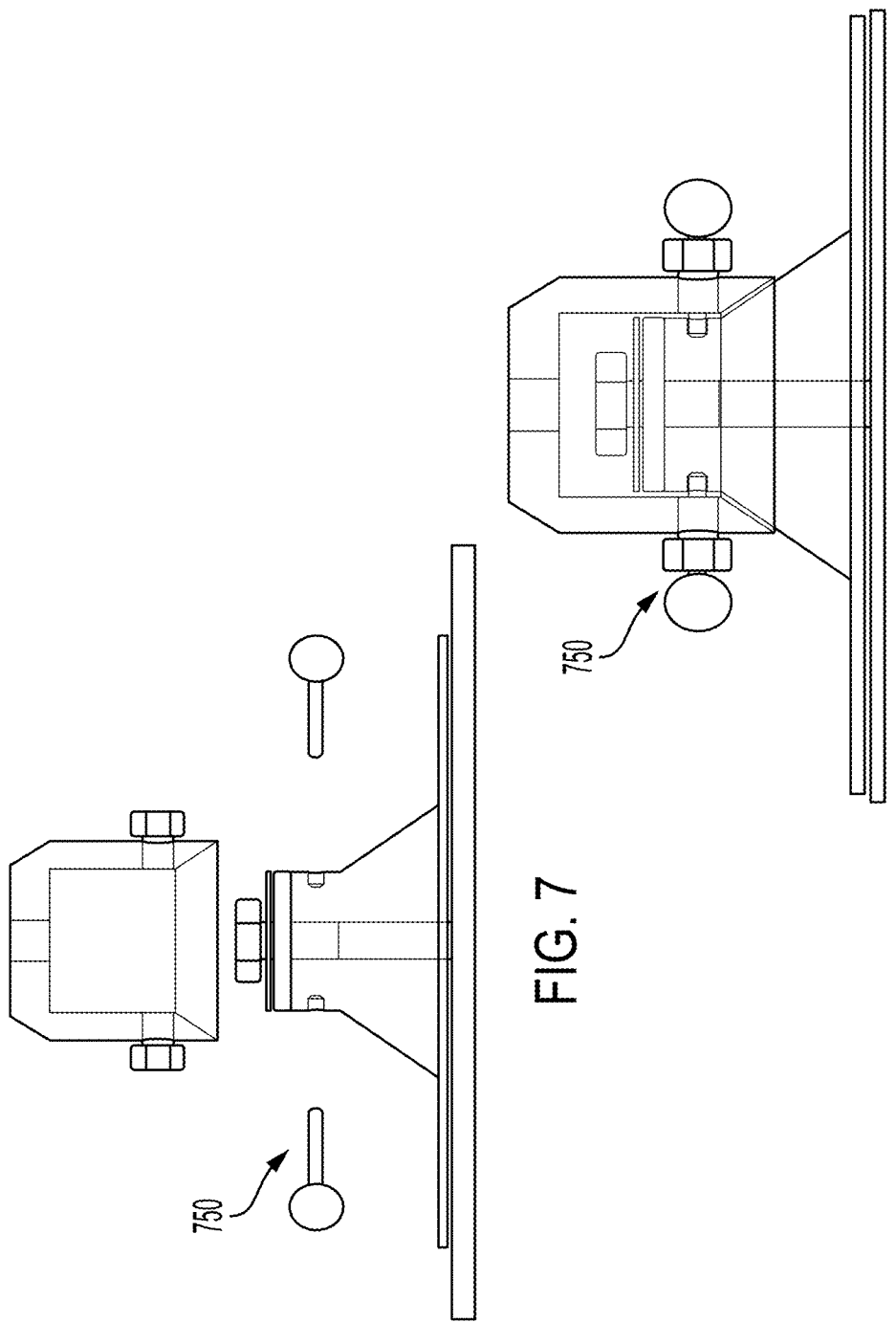

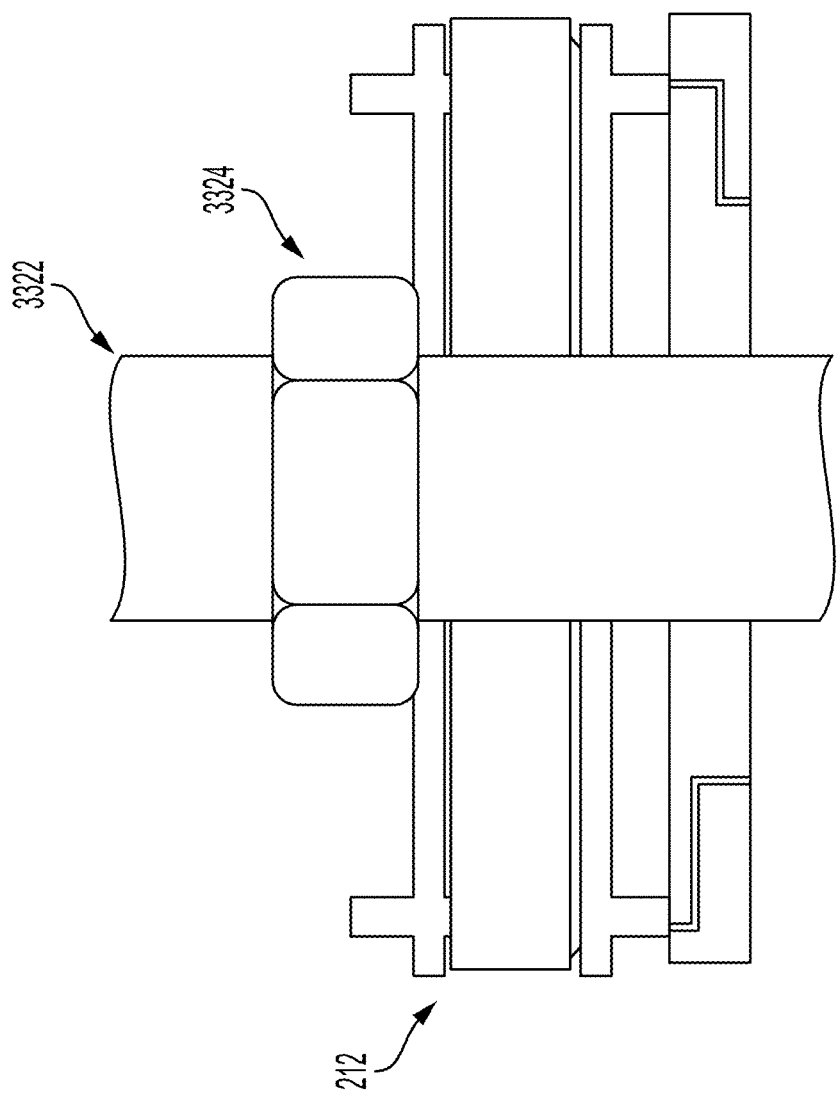

SYSTEM AND METHOD FOR MOUNTING OBJECTS ON ROOFS AND SURFACES

CROSS REFERENCE TO RELATED APPLICATIONS

The instant application claims priority to U.S. Provisional Application 62/523,343 entitled SYSTEM AND METHOD FOR MOUNTING OBJECTS ON ROOFS AND SURFACES filed on Jun. 22, 2017. The instant application also relates to U.S. patent application Ser. No. 13/927,776 filed Jun. 26, 2013 entitled SYSTEM AND METHOD FOR INSTALLING SOLAR PANELS BASED ON NUMBER OF PANELS AND OUTPUT OF PANELS, Ser. No. 13/964,485 filed Aug. 12, 2013 entitled SYSTEM AND METHOD FOR INSTALLING SOLAR PANELS, and Ser. No. 15/270,126 filed Sep. 20, 2016 entitled SYSTEM AND METHOD FOR INSTALLING SOLAR PANELS. Each of the foregoing patent applications is incorporated herein by reference in their entireties.

FIELD OF THE INVENTION

The various embodiments described herein relate generally to the installation of roof top mounted equipment, such as solar panels. More particularly, various embodiments herein relate to a methodology for installing solar panels on rooftops that minimizes or eliminates the need for specialized training or knowledge in mounting of electrical power systems, and provides an objective improvement in PV system structural and grounding safety.

BACKGROUND

Solar technology presents a viable green source of energy as an alternative to fossil fuels. This is particularly the case for geographic areas that have a high amount of daylight and/or higher than average fuel costs, such as Hawaii, California, N.Y., etc.

An ongoing obstacle to the adoption of solar panels as a home energy solution remains the expense, particularly in the purchase of the components and the installation. A typical residential solar system will include a number of solar panels mounted on a roof and connected by electrical cables to a junction box. The output of the junction box is then fed to load distribution center for internal use. Electrical cable between the solar panels and the junction box are cut to length, and spliced ends of the wires are connected to terminals using generally known methodologies familiar to the field of electricians.

Referring now to FIGS. 1A and 1B, an example of a prior art mounting methodology is shown. Solar panels (not shown in FIGS. 1A and 1B) are supported by aluminum extension tubes 102. The extension tubes are mounted via bolts 104 to a vertical side of an L-bracket 106. The horizontal side of L-bracket 108 is mounted via a lag bolt 108 into a mount 110 on a roof 112. The lag bolt 108 penetrates into a wooden beam 108 under the roof 112.

A drawback of the above system is that consumers are not familiar with the installations process and are not experts in mounting systems, and may mount the panels incorrectly if they attempted to install them without professional assistance. Jurisdictions thus often require professional installers to install solar panel systems to ensure safe and proper installation, which adds to the overall installation costs. In general, any wired in place solar or electrical system must be installed by a licensed electrical contractor. Jurisdictions also impose plan review and inspection requirements, which further adds to overall installation costs.

BRIEF DESCRIPTION OF THE DRAWINGS

Various embodiments in accordance with the present disclosure will be described with reference to the drawings, in which:

FIGS. 7 and 8 are cross sections of a mounted cap according to another embodiment of the invention.

FIG. 33 is a close up side cross section view of mounting components with an inserted lag bolt according to another embodiment of the invention.

DETAILED DESCRIPTION

Figure 1B:
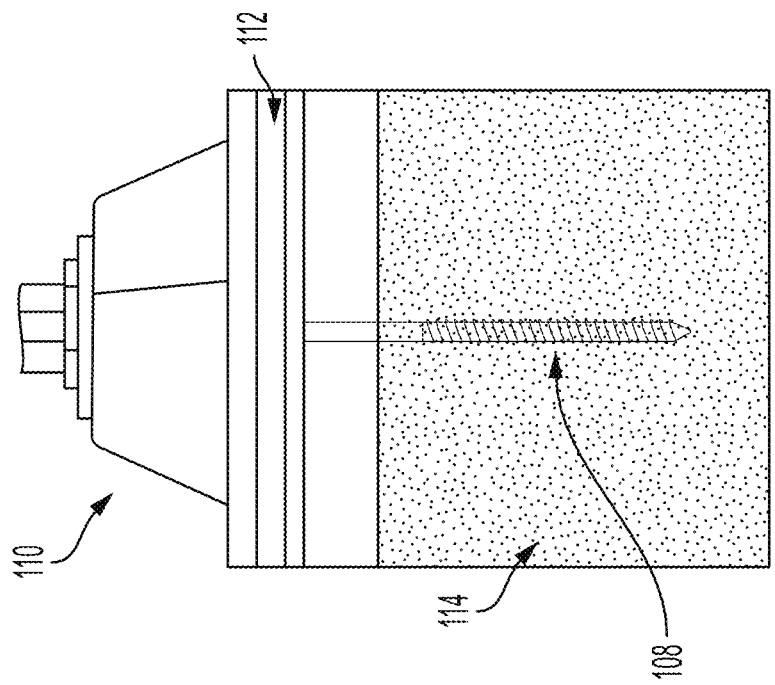
FIGS. 1A and 1B illustrate a prior art support mechanism.
Figure 1A:
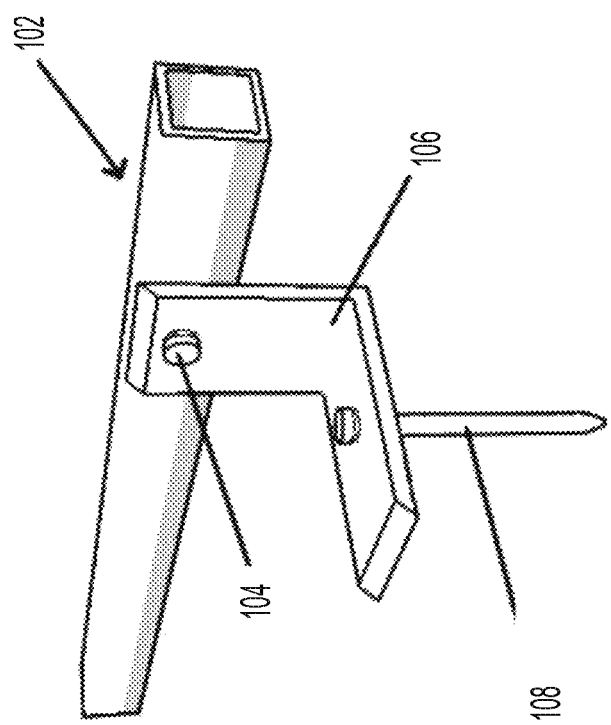

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. An individual skilled in the relevant art will recognize that other components and configurations may be used without departing from the scope and spirit of the claimed subject matter.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like. The term "a" means "one or more" absent express indication that it is limited to the singular. "First," "second," etc. are labels to differentiate like terms from each other, and does not imply any order or numerical limitation. A structure that is "configured to" or "adapted to" perform a function means that the structure is both capable of performing that function and will perform that function when in actual use.

Unless otherwise specified, all references to connections, mounting, supports or the like include both direct (without intervening components) and indirect (with intervening components) relationships. By way of non-limiting example, A mounted on B includes A being directly mounted on B, or A mounted on intervening components which in turn are mounted on B.

"Lag bolt" refers to an at least partially threaded rod for connecting components, such as nail, screw or bolt, either with or without a head. A traditional screw or a traditional bolt are examples of lag bolts. A threaded rod with no head in combination with a mounted nut is also an example of a lag bolt. Threads may or may not be uniform across the length of the pin, e.g., a hanger bolt which has different types of threads at both ends and lacks a head, or a bolt with a partially threaded surface portion and an unthread surface portion.

"Circuit component" refers to any circuit component, singular or plural, including potentially a single conductive pathway. Thus resistors, capacitors, inductors, integrated circuits, either individually or in combinations thereof are non-limiting examples of a "circuit component."

Because of safety concerns, any wired in place solar or electrical system is typically installed by a licensed electrical contractor and subjected to electrical plan review and inspection. Embodiments herein provide methodologies and architecture that address those safety concerns. Embodiment herein can thus reduce or eliminate the need for site-specific engineering and allow anyone to safely connect and install a solar panel system.

Figure 2:
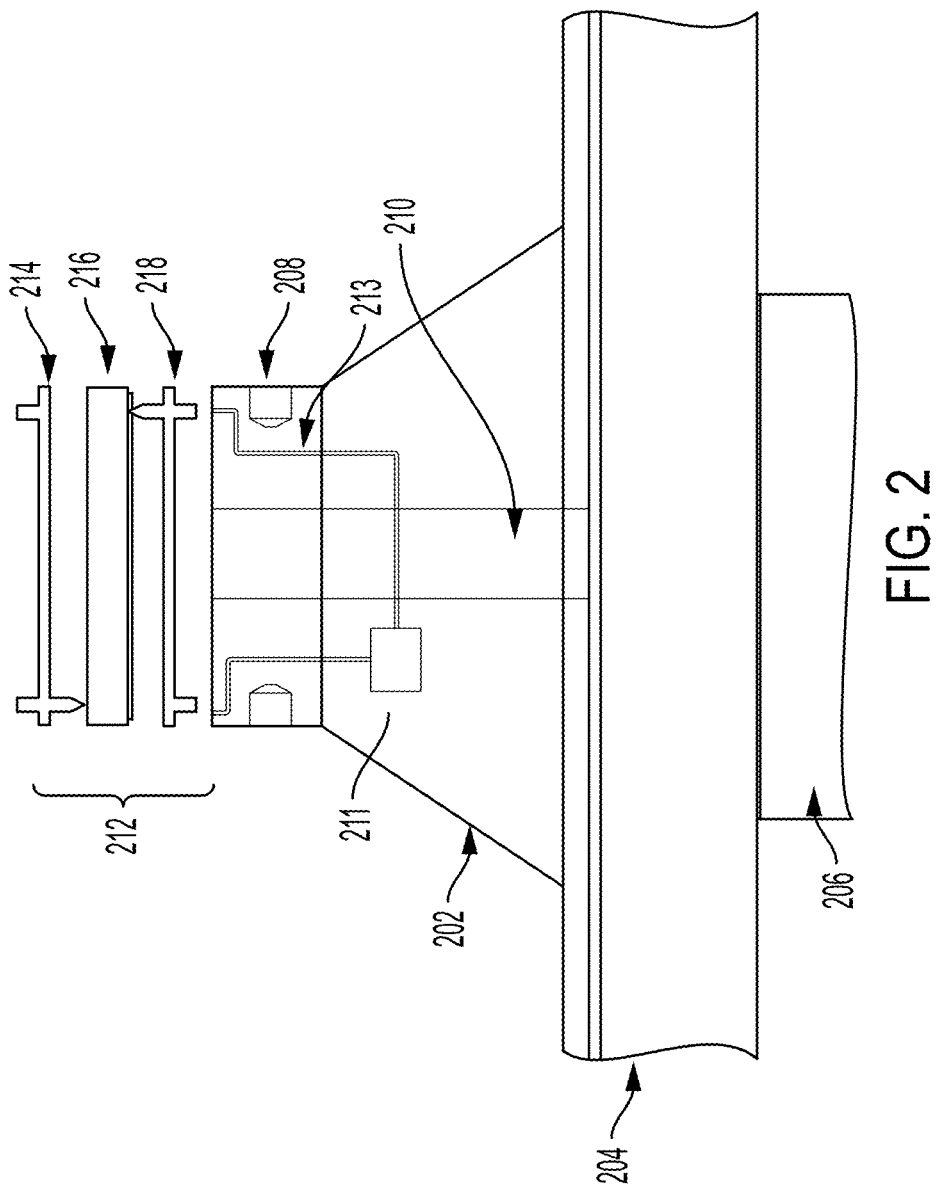
FIG. 2 is a side cross section view of mounting components according to an embodiment of the invention.

Referring now to FIG. 2, an embodiment of a mounting system is shown. A base 202 rests on a support surface 204 (typically a roof, although the invention can be used on any support surface) with an underlying beam 206. The base 202 may be supported on the support surface 204 directly (without intervening components) or indirectly (with intervening components, such as by way of non-limiting example roof flashing materials to prevent water penetration).

Base 202 has at least one side hole 208 for receiving a connector (discussed below); two opposing holes 208 are shown in the FIG. 2, although the invention is not so limited, and any number of holes 208 may be provided in any orientation. A circuit component 211 may be embedded in the base 202. At least one electrical pathway 213 extends from the circuit component 211 to the top of base 202.

A pressure washer 212 is positioned above base 202 and has a top layer 214, a middle layer 216 and a bottom layer 208. Layers 214/216/218 may be physically separate or part of a unitary/assembled component.

Figure 3:
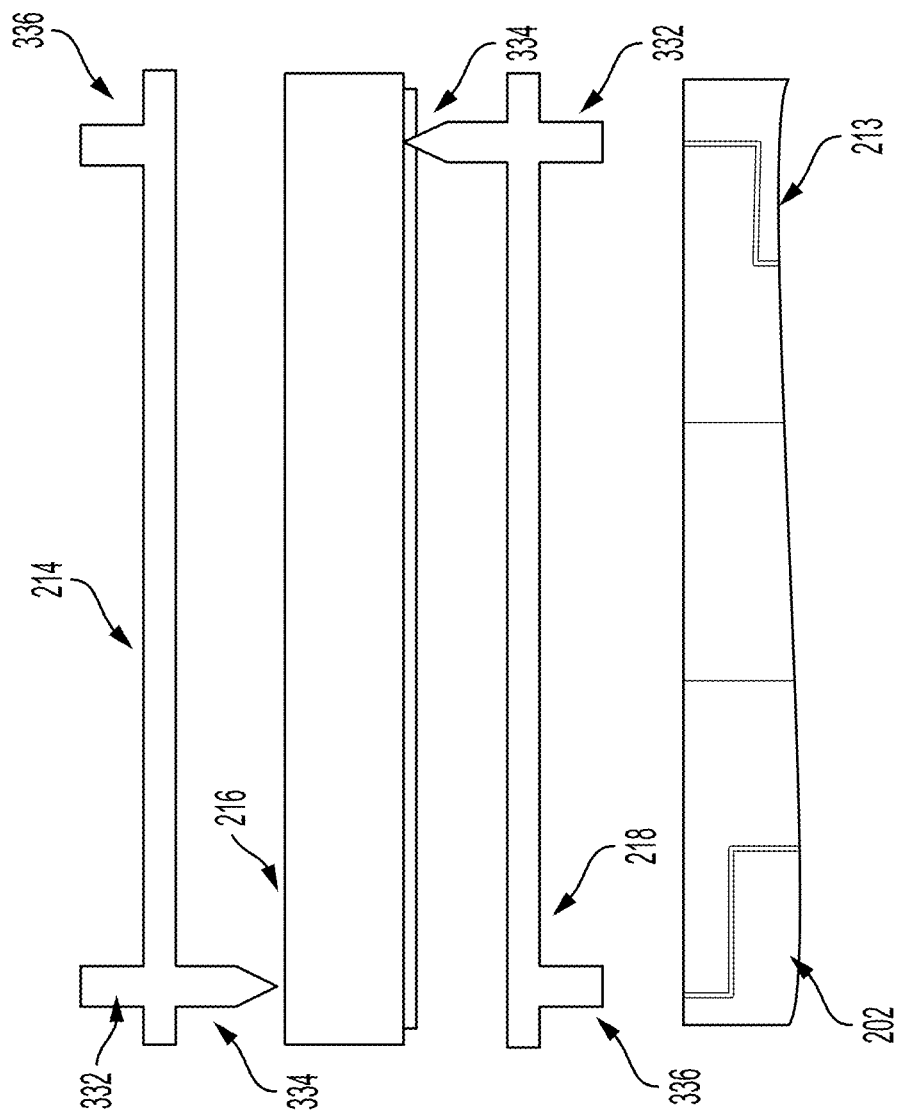
FIG. 3 is a close up side cross section view of mounting components according to an embodiment of the invention.
Figure 4:
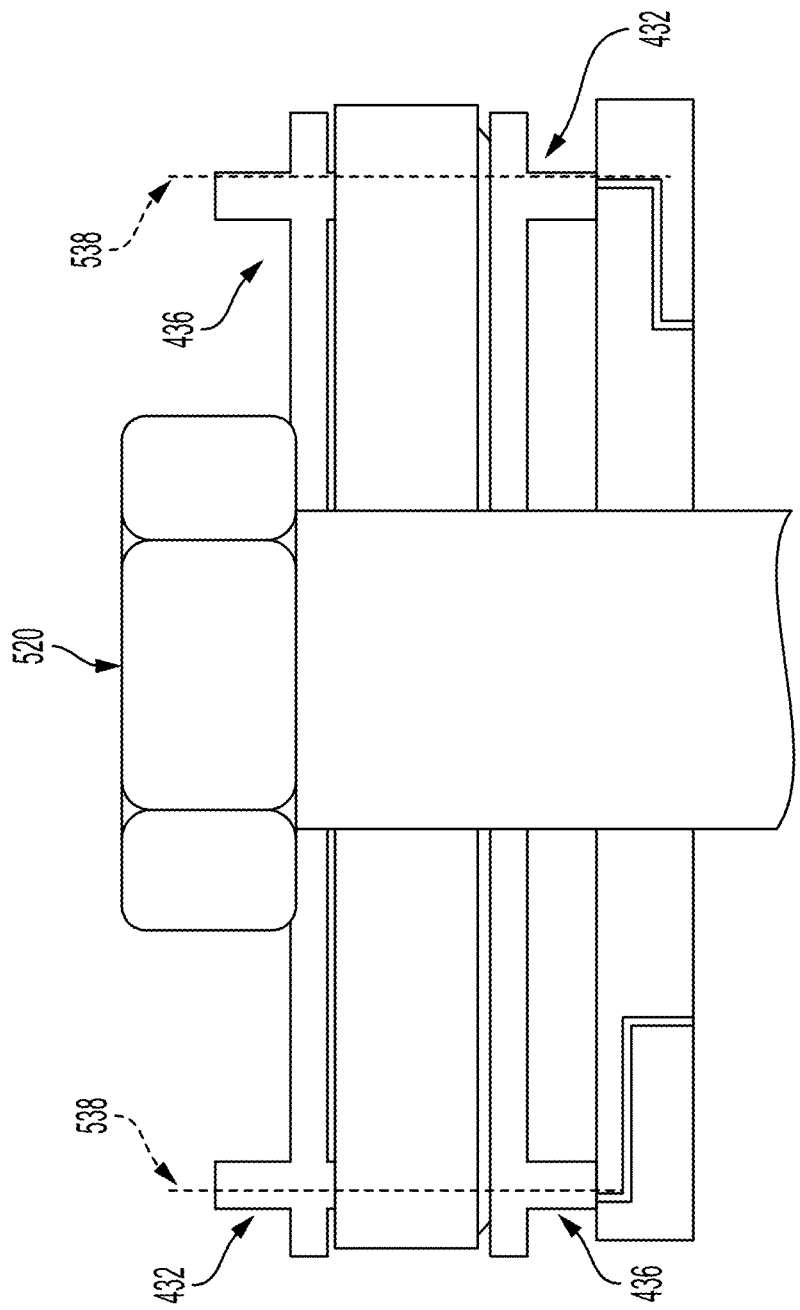
FIG. 4 is a close up side cross section view of mounting components with an inserted lag bolt according to an embodiment of the invention.

Referring now to FIG. 3, pressure washer 212 is shown in more detail relative to the top of mount 220 before the installation of a lag bolt. One or both of layers 214 and 218 have a conductive spike 334 with terminal ends 332, for which the spiked end points toward and aligns with a terminal 336 of the opposing layer; two such spikes 334 are shown in FIG. 4 on opposite sides of pressure washer, but the invention is not so limited and any number of spike/terminals pairs may be present in any distribution pattern. Layer 216 is an insulator material (at least in the vicinity of the spikes/terminals) that separates the spikes 334 from connectors 336. Each terminal 332/336 on the side of layer 218 facing the top of base 202 aligns with and acts as an electrical terminal for each electrical pathway 213.

Figure 5:
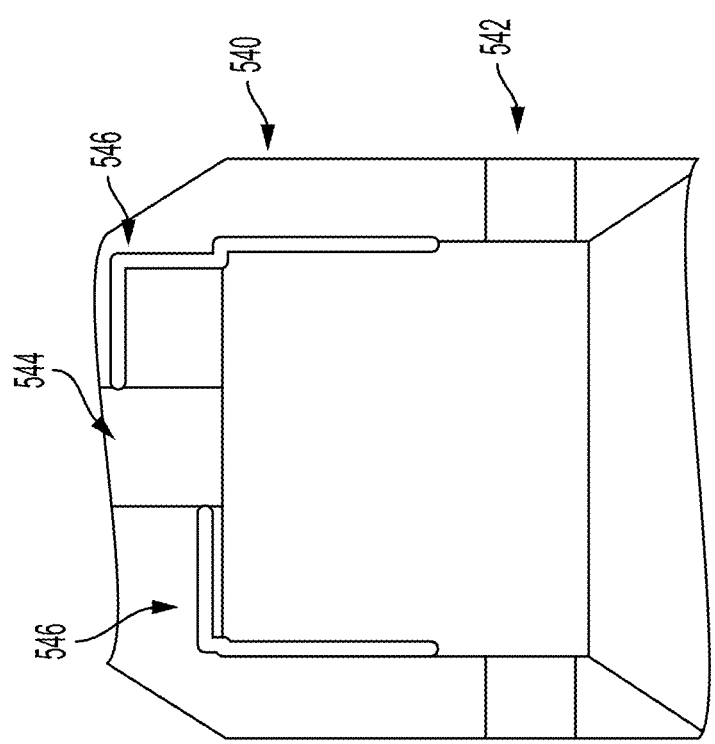
FIG. 5 is a cross section of a cap of mounting components according to an embodiment of the invention.

Referring now to FIG. 5, base 202 and pressure washer 212 have a central hole configured to receive a lag bolt 420 that will anchor the base 202 into the beam 206. Prior to insertion of the lag bolt, layer 216 electrically isolates spikes 334 of layers 214 and 218, such that the there is no electrical pathway from circuit component 211 to the other components above pressure washer 212. When lag bolt 420 is inserted into the central hole and tightened into place, the head of lag bolt 420 applies downward pressure on pressure washer 221, driving spikes 334 through layer 216 into contact with the terminals 336. This defines an electrical pathway 538 for each spike/connector combination, from which electrical component 211 can now be accessed above the pressure washer 212.

The above embodiment provides confirmation that lag bolt 420 is installed properly, via detection of circuit component 211 by remote equipment (e.g., a smart station as described in U.S. patent application Ser. No. 15/270,126, although the invention is not so limited). The newly created electrical pathway 438 in is response to insertion of the lag bolt to an appropriate depth to force spikes 334 to pierce layer 218 into contact with terminals 336. If the lag bolt 420 is not installed to the proper depth, then the pressure washer 212 will not be sufficiently compressed (or compressed at all), such that electrical pathway 438 is never formed and circuit component 211 remains electrically isolated. Additionally this assembly can measure pull out strength and make sure that the minimum required pull out strength has been achieved by threading a nut over the top of a threaded lag bolt and tightening against the pressure washer to the required torque value to compress the spikes through the resistive layer.

Referring now to FIG. 5, a cap 540 for mount 540 is shown. Cap 540 includes side holes 542 which align with holes 208 in base 202, and a top central hole 544 aligned with lag bolt 420. When cap 540 is mounted on mount 22, electrical pathways 546 align with terminal ends 432 and extend either into top central hole 544 and/or the top of cap 540.

Figure 6:
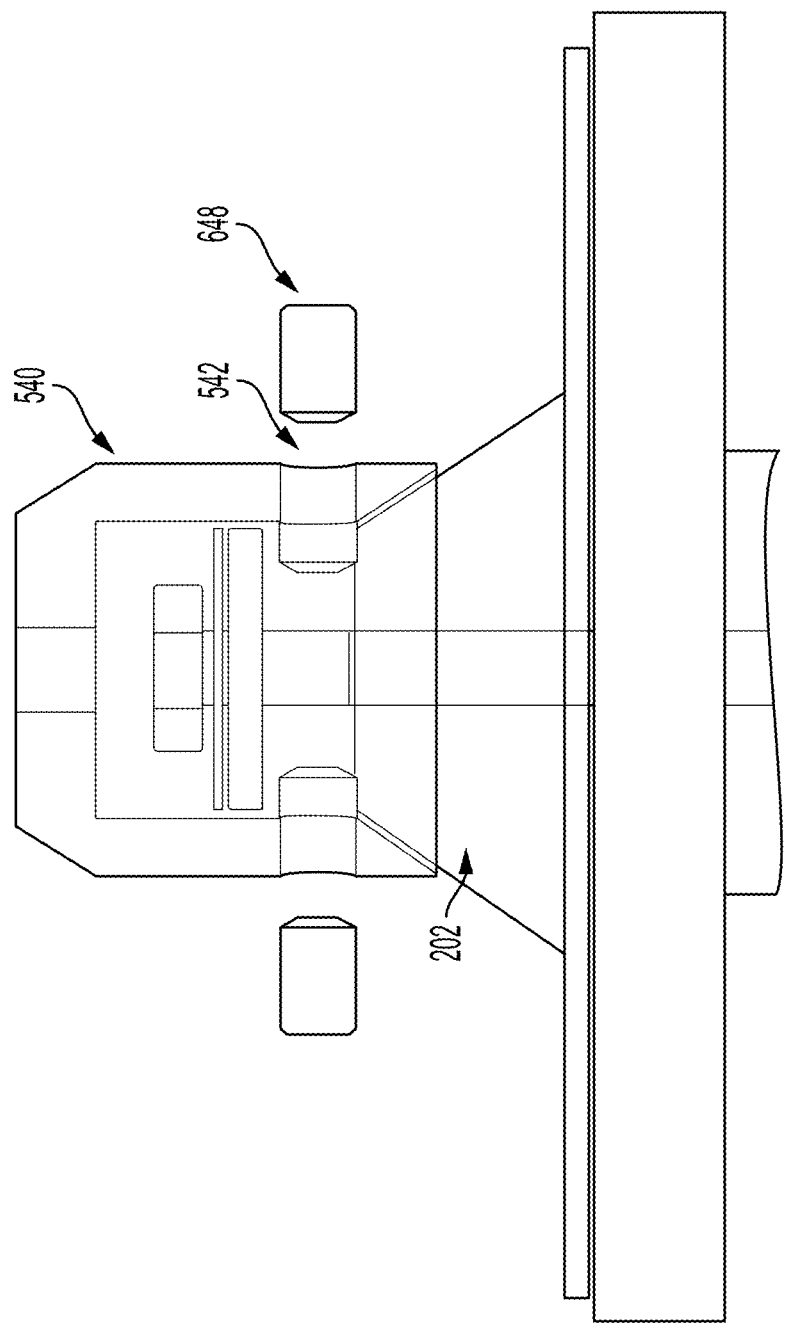
FIG. 6 is a cross section of a mounted cap according to an embodiment of the invention.

FIG. 6 shows cap 540 mounted on base 202. When cap 540 is installed on base 202. Connectors 648, which are preferably hex bolts, are inserted into side holes 542 and holes 208 to connect cap 540 and base 202.

Other connection methodologies between cap 540 and base 202 may be used. FIGS. 7 and 8 show another example of such a methodology based on hand held pins 750. The invention is not limited to the structure and/or methodology of the connection.

Figure 9:
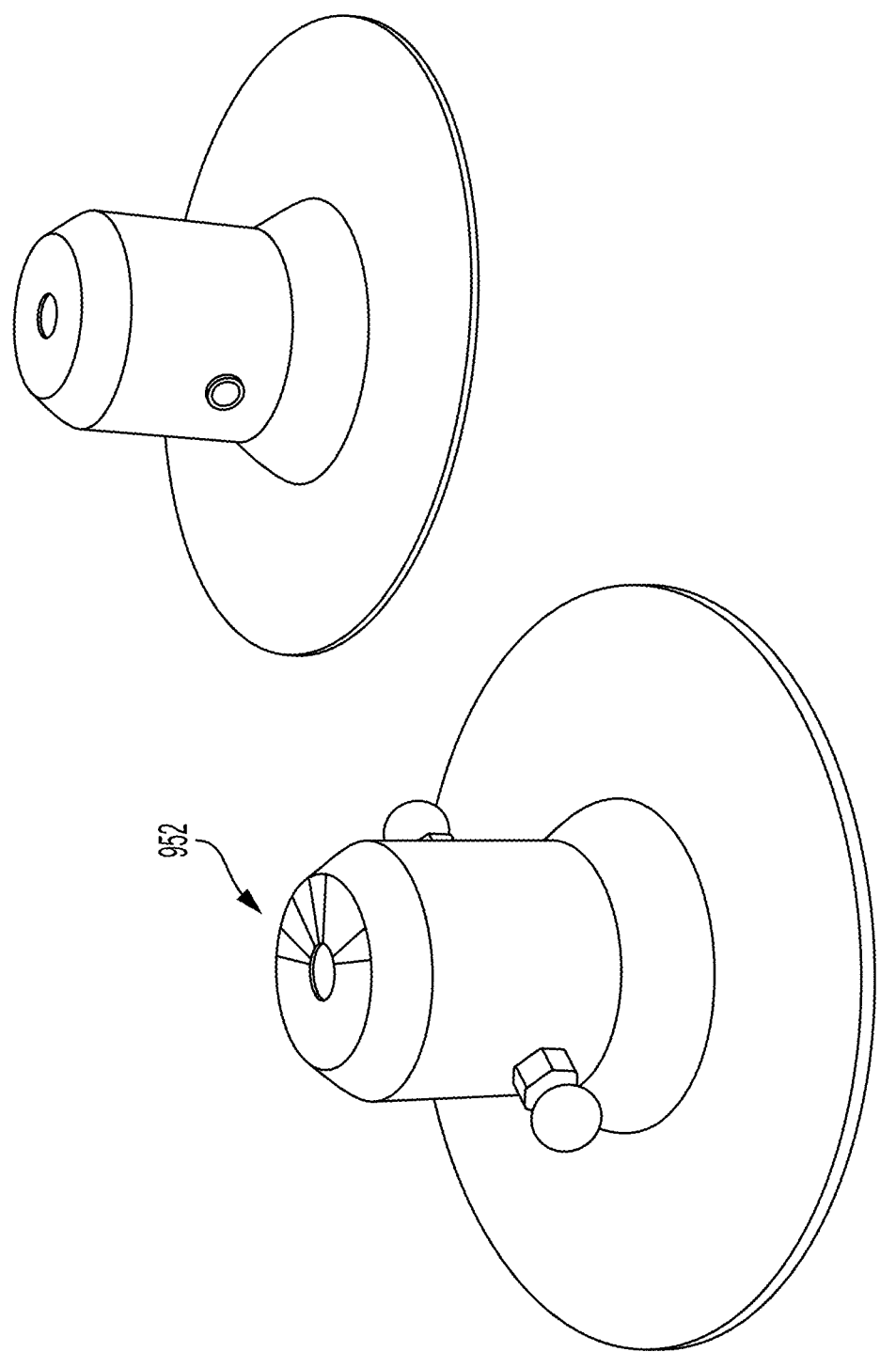
FIG. 9 is a perspective view of a mounted cap according to an embodiment of the invention.

Referring now to FIG. 9, the top of cap 540 may be scalloped with ridges 952 to facilitate connection with upper interface components as described below.

Figure 10:
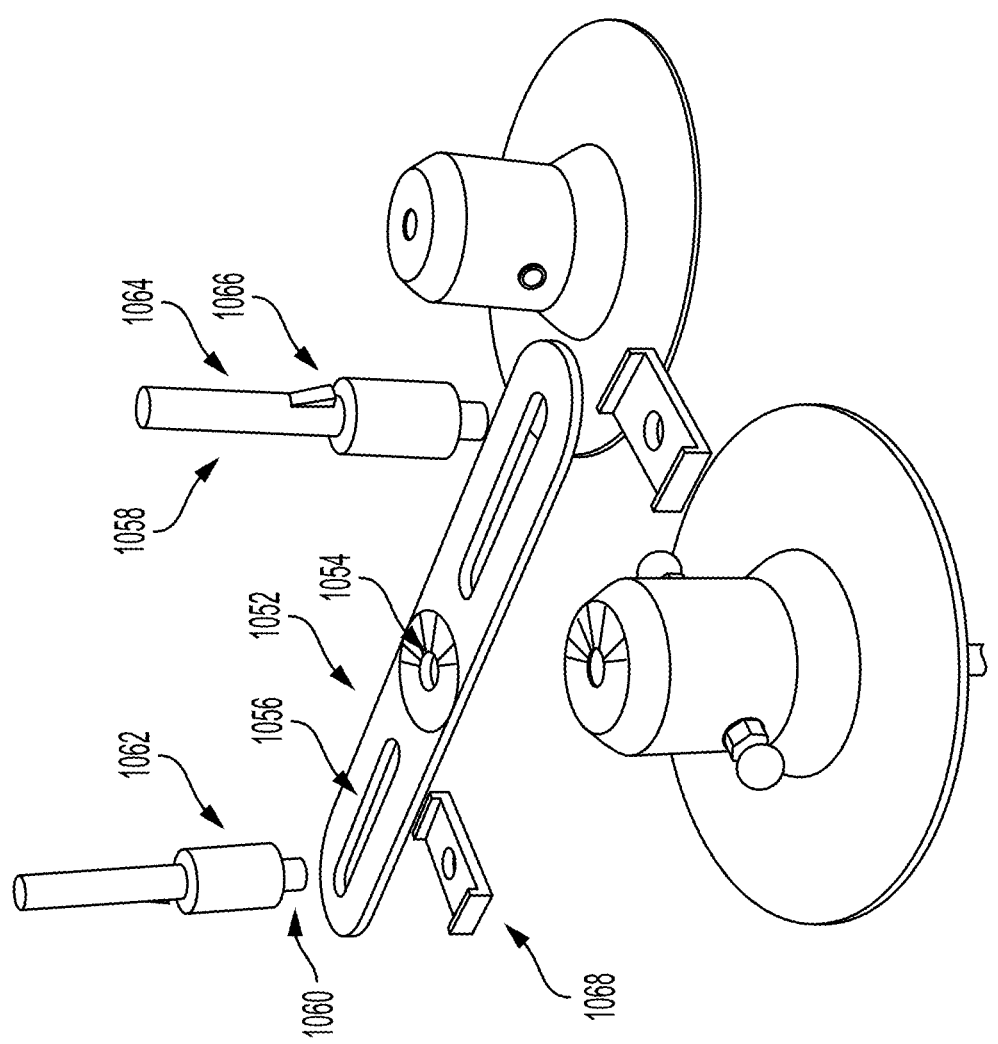
FIGS. 10-13 are perspective views of a mounted cap with intervening connector components according to an embodiment of the invention.
Figure 11:
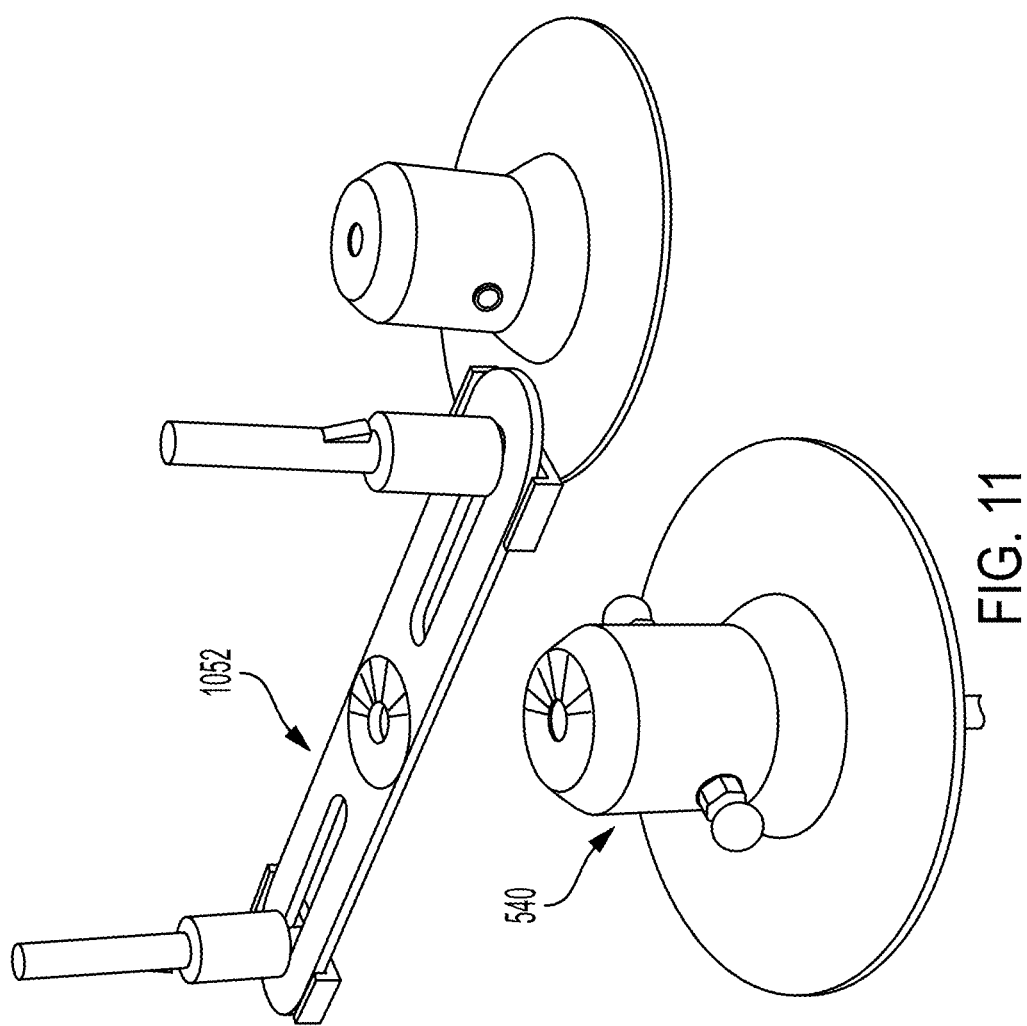

FIGS. 10 and 11 show a first set of interface components in an exploded (FIG. 10) and assembled (FIG. 11) state for mounting on cap 540. An arm 1052 has a central opening 1054 aligned with top hole 544, and elongated slots 1056. Pins 1058 have a lower threaded end 1060, a larger diameter section 1062, and an upper end 1064 with a spring latch 1066. Lower threaded end 1060 extends through the slots 1056 of arm 1052 into a threaded bracket 1068; the elongated slots allow for positioning of pins 1058 at the desired location along arm 1052, and the position is secured by screwing lower threaded end 1060 into threaded bracket 1068 on the underside of arm 1052 until the bottom of a thicker diameter section 1062 of each pin 1058 comes to rest on arm 1052.

Figure 12:
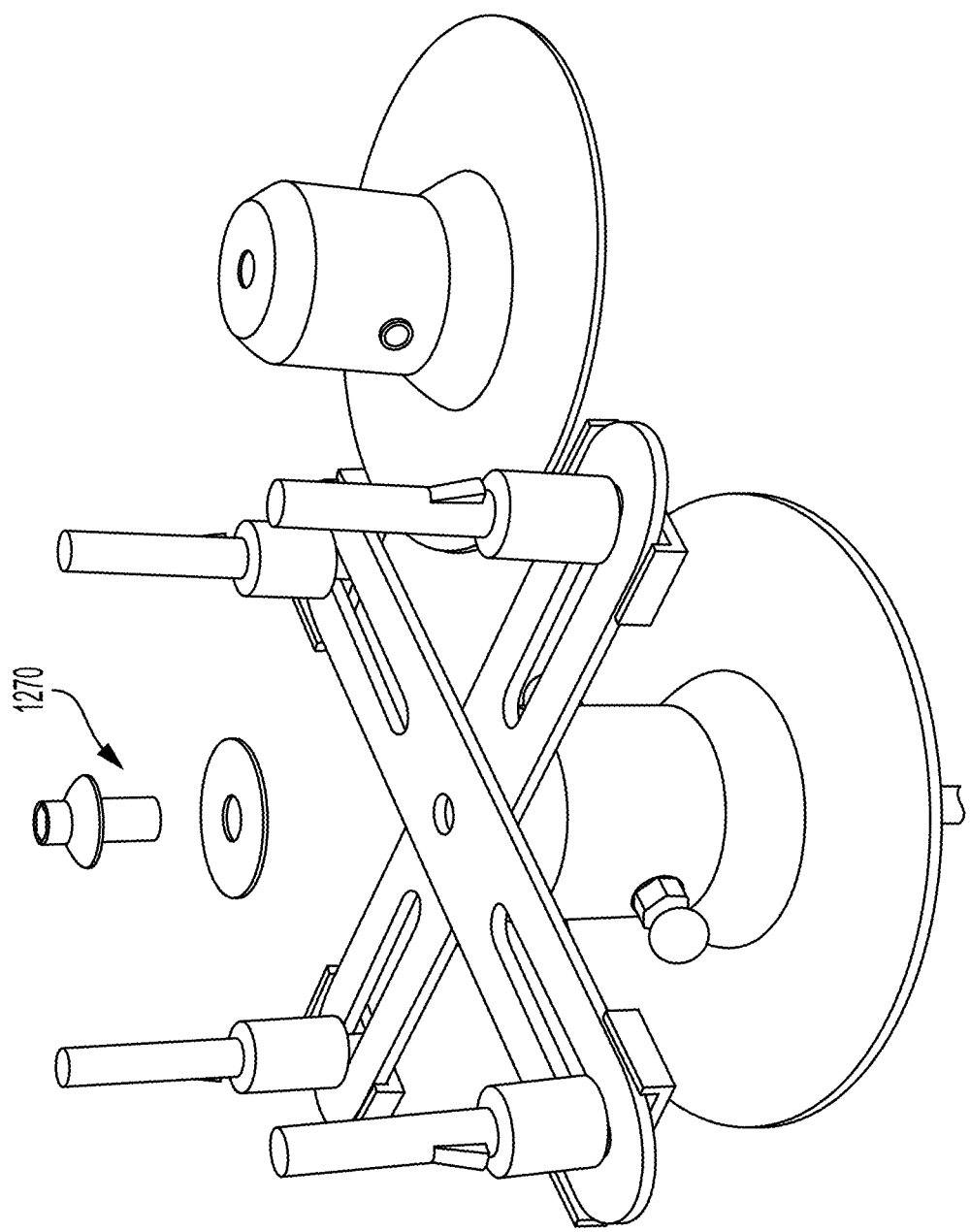
Figure 13:
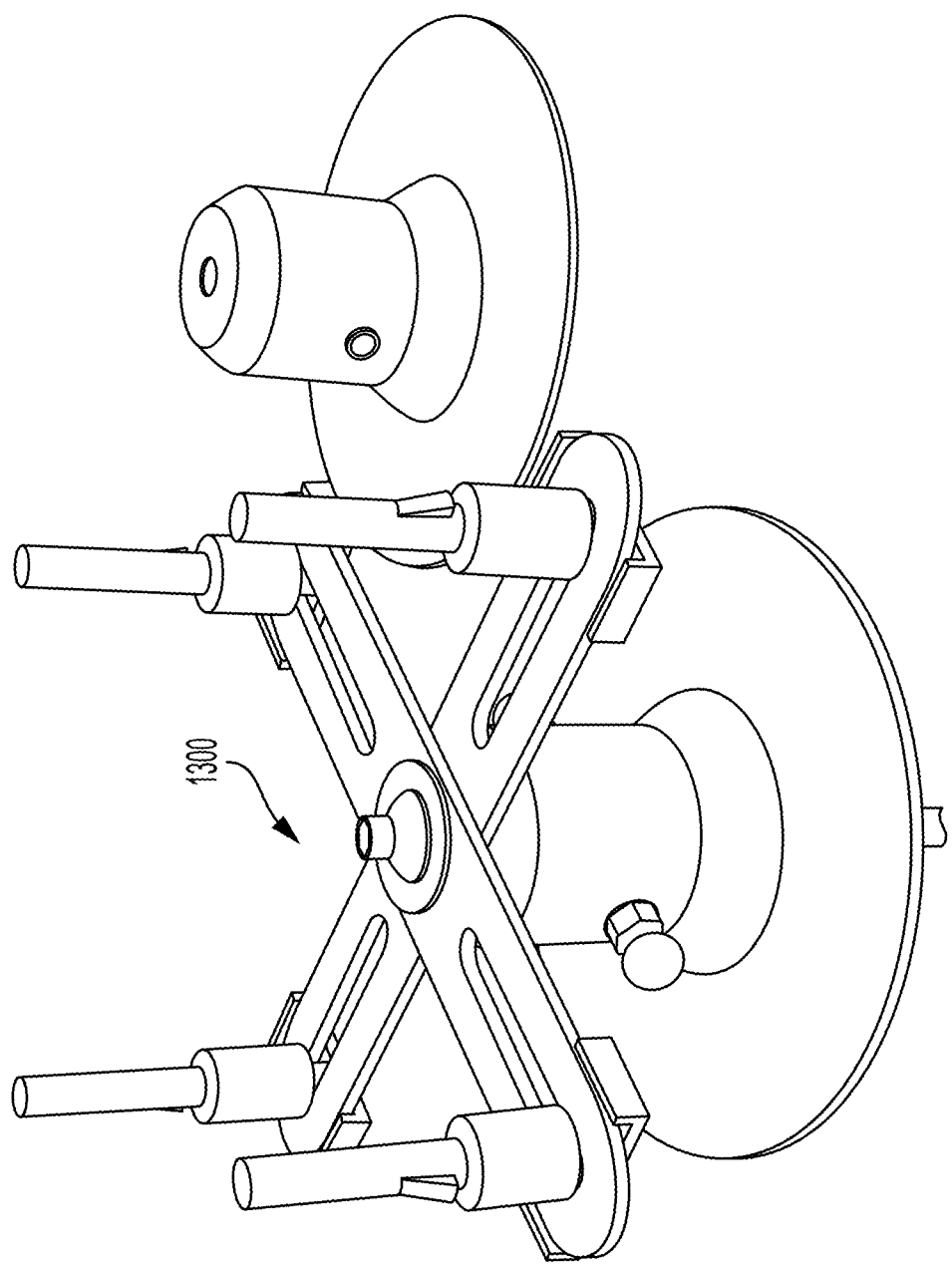
Figure 14:
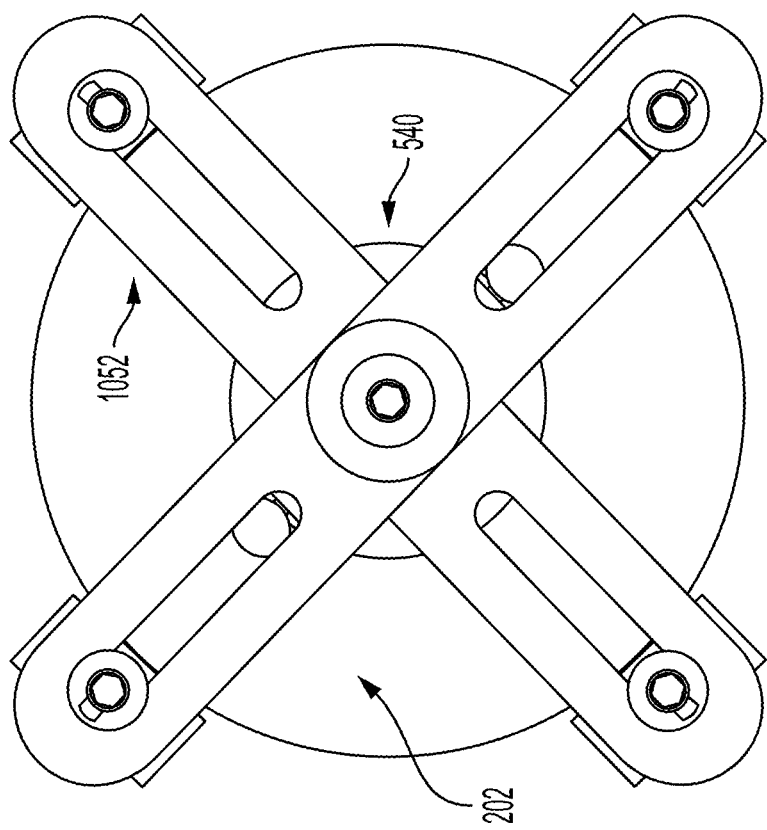
FIG. 14 is a top view of the embodiment of FIG. 10.

FIGS. 10 and 11 show a single arm 1052. However, the invention is not so limited, and any number of arms may be present, for which two arms are preferable as shown in FIGS. 12-14.

A threaded pin 1270 secures the arms 1052 onto cap 540 via central hole 1054. Arms 1052 can be rotated about threaded pin 1270 into a desirable angular position to thereby orient pins 1058 into desired angular positions; in combination with the radial adjustability provided by slots 1056, pins 1058 can be provided at any desired position within a maximum distance of the end of the slots 1056 from the center hole 1054. Scalloped edges on arms 1052 can mate with scalloped edges 952 on top of cap 540 may provide preset engagement positions for specific alignments.

The assembled mount 1300 can now support objects on the roof. Objects to be supported can be lowered onto pins 1058 to secure them in place. FIGS. 15-19 show non-limiting examples of a frame 1572 of solar panels secured to the mounting components. Holes 1574 in frame 1572 slide over the upper section 1064 of pins 1058 to rest on thicker diameter portion 1062, and are locked in place by spring latch 1066.

Figure 16:
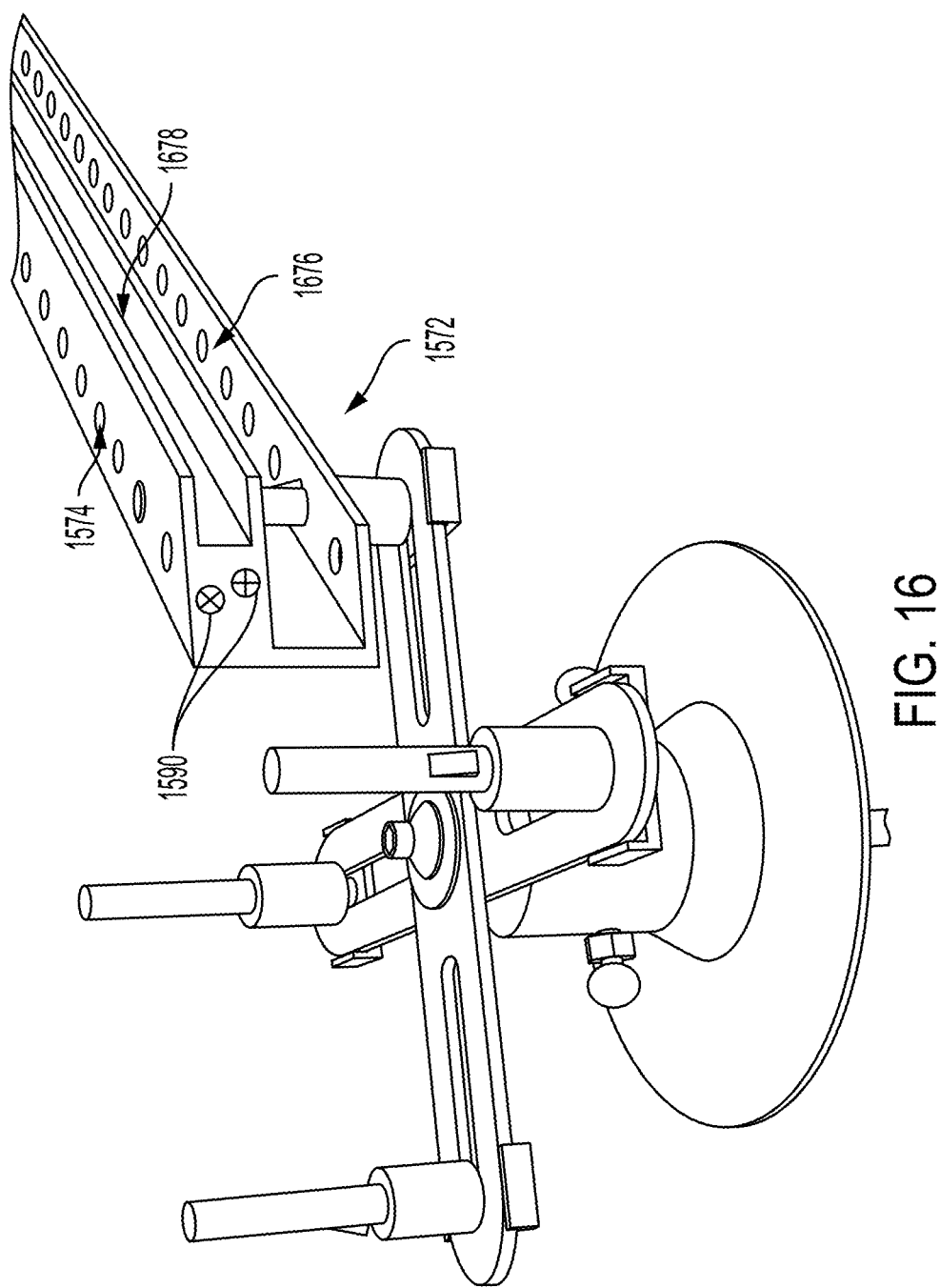
FIGS. 16-18 are upper perspective, lower perspective, and side views of FIG. 15 with the frame shown in cross section according to an embodiment of the invention.
Figure 17:
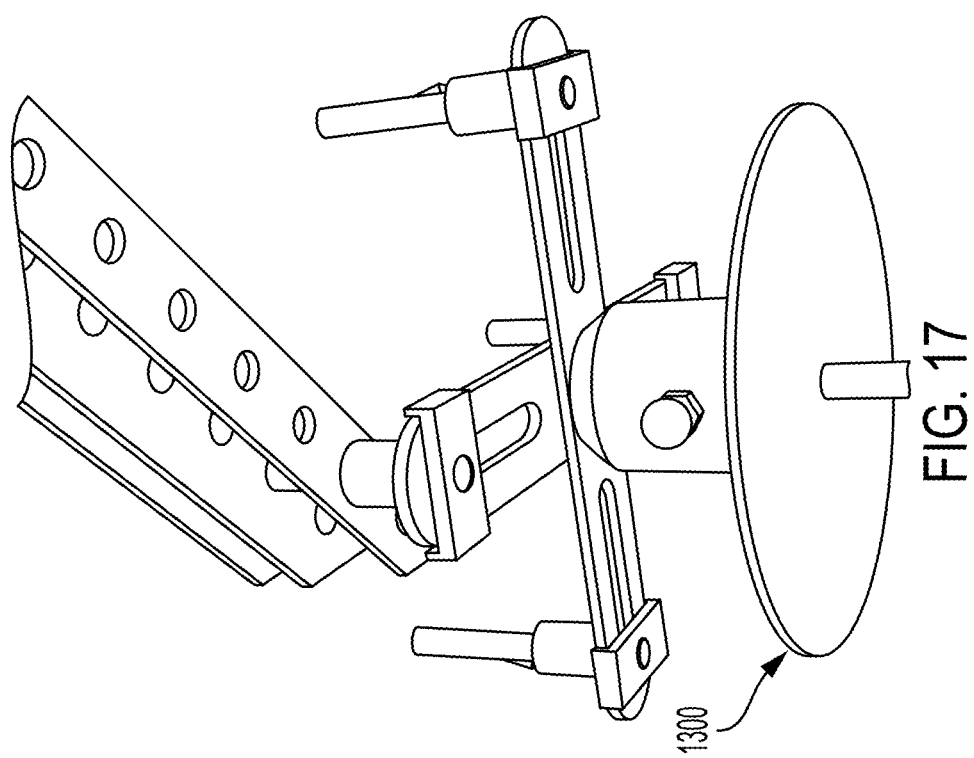
Figure 18:
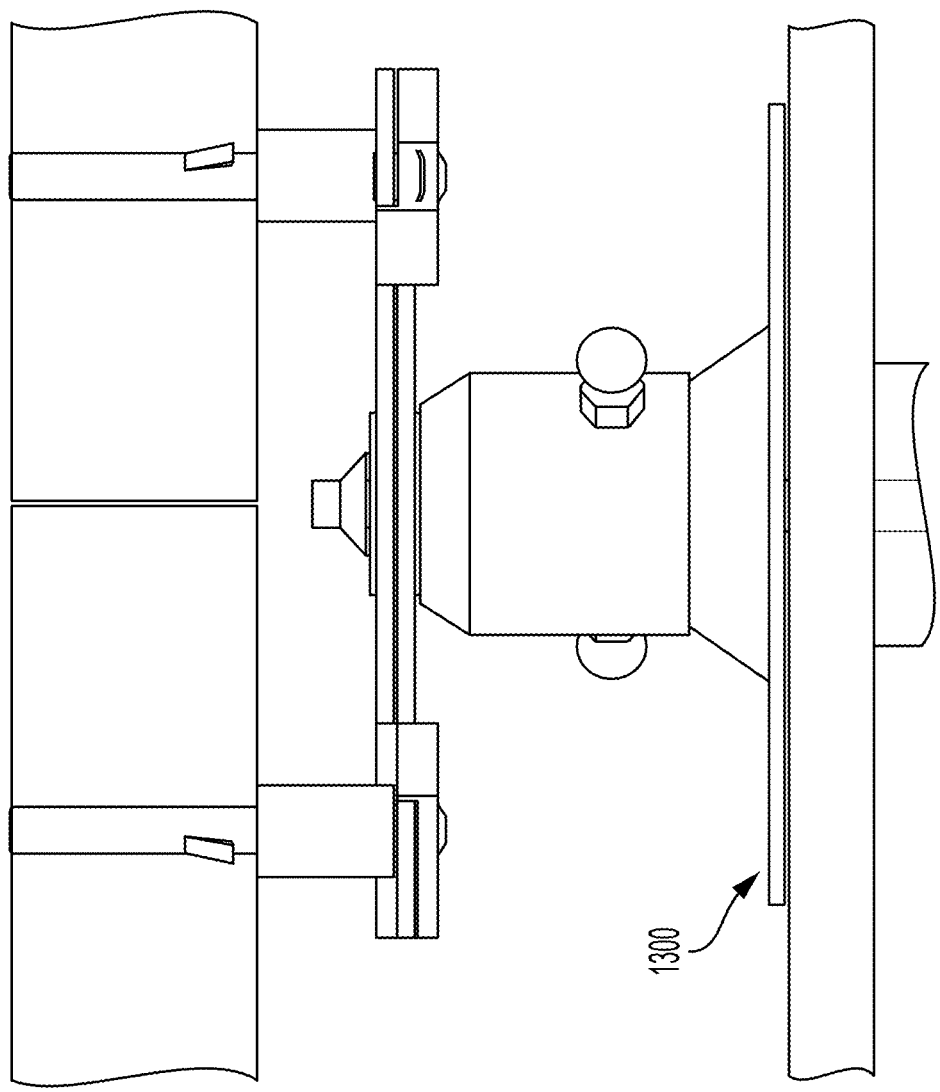
Figure 19:
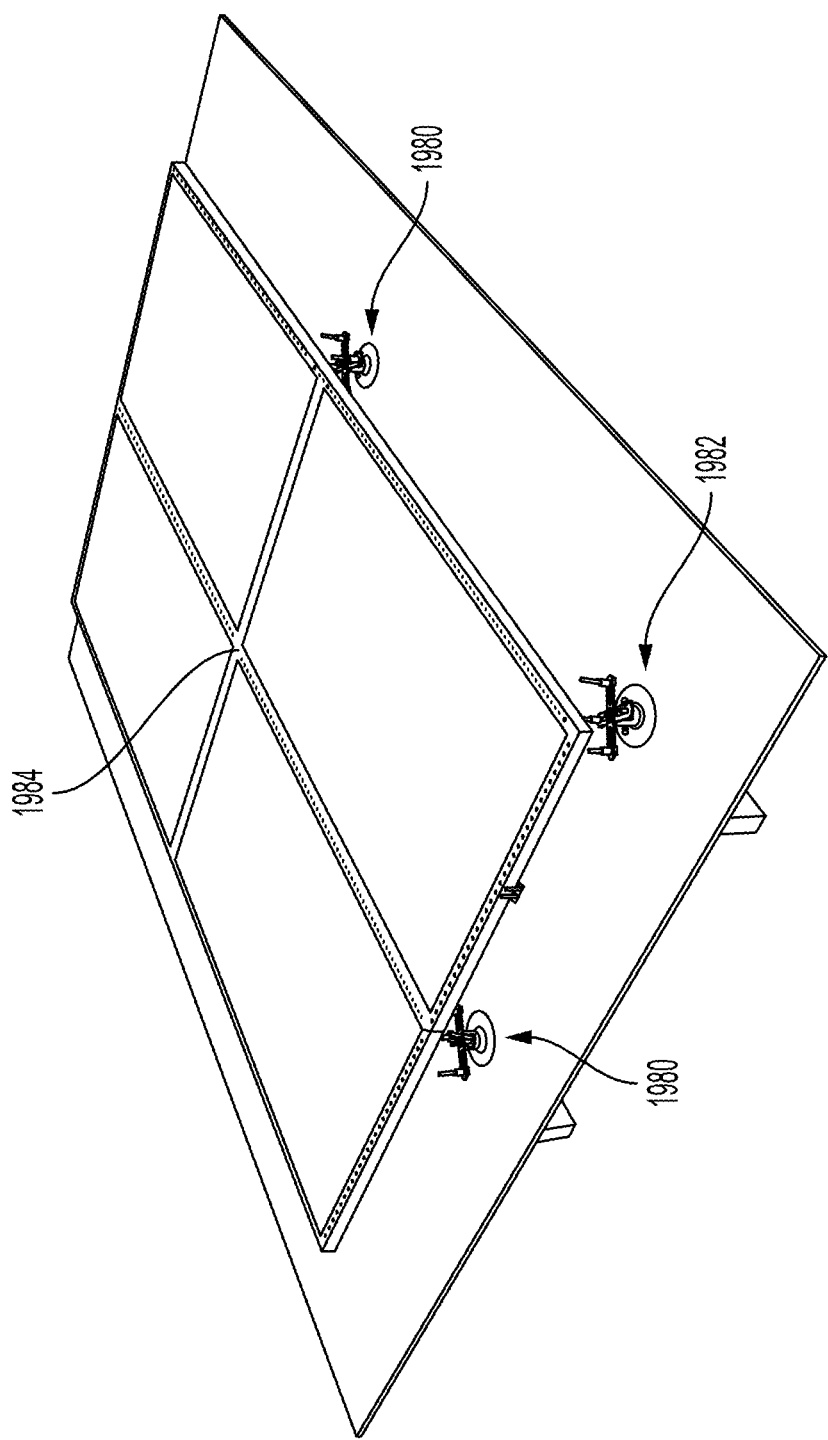
FIG. 19 is a perspective view of an array of mounting structure supporting multiple solar panels according to an embodiment of the invention.

Referring now to FIG. 16, frame 1572 is preferably an extruded elongated metal member with a lower channel 1676 and an upper channel 1678. Lower channel 1676 provides space to accommodate the spring latch 1066. The upper channel 1678 holds the solar panel. The upper channel is not as deep as the lower channel, such that holes 1574 pass through the top to the bottom of frame 1572 without entering upper channel 1678. In this configuration the pins 1058 pass behind the solar panel.

Figure 15:
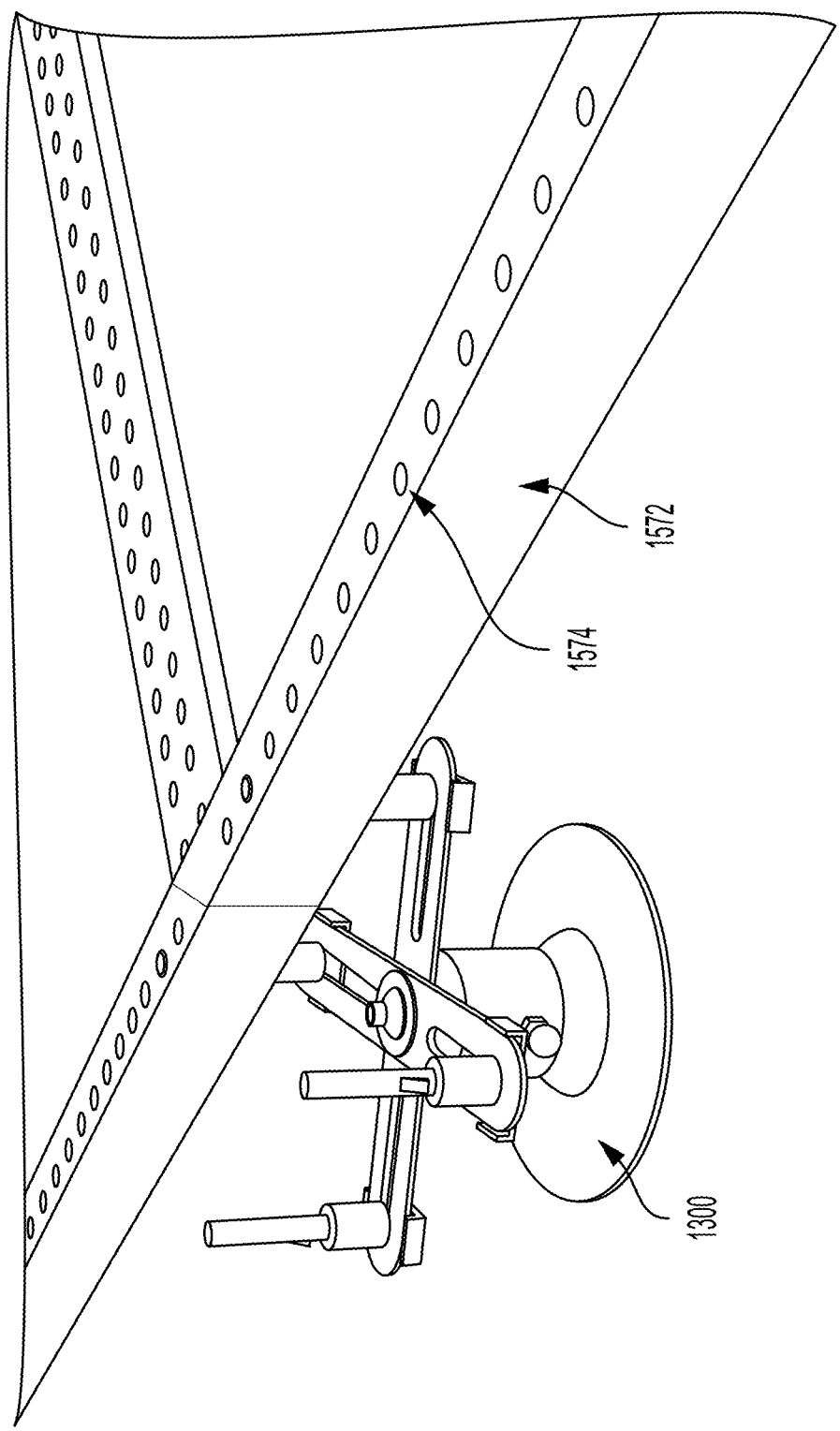
FIG. 15 is a perspective view of an assembled mounting structure of FIG. 13 supporting a frame component according to an embodiment of the invention.

The assembled mount 1300 may be centered at the junction of adjacent solar panels such that each pin 1058 supports a frame of a separate panel as in FIG. 15, but the invention is not so limited. For example, in FIG. 19, completed mounts 1980 support two adjacent solar panels, while completed mount 1982 only supports one solar panel. Another mount (not shown) could be below the center point 1984 to support four adjacent solar panels.

Figures 20, 21:
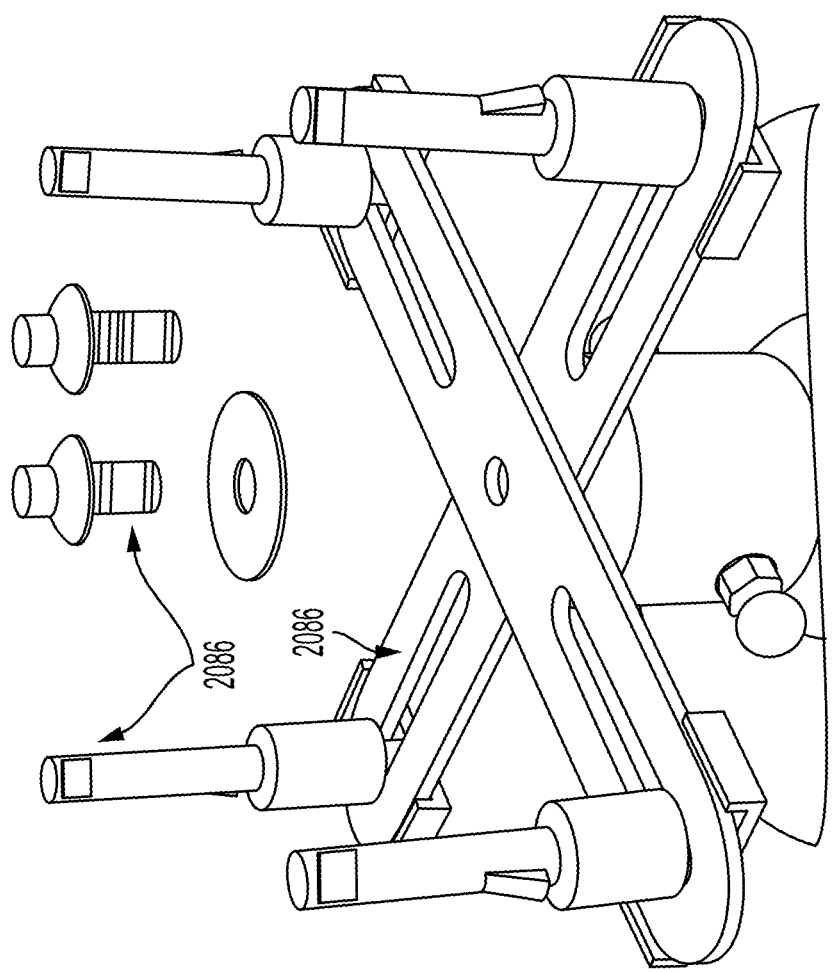
FIGS. 20 and 21 are perspective views of the intervening connector components of FIGS. 10-13 with electrical pathways according to an embodiment of the invention.

Referring now to FIGS. 20 and 21, arms 1052, pins 1058 and threaded pin 1270 may include conductive pathways 2086 that connect to the electrical pathways 546 in cap 540, which in turn connect to circuit component 211 through the intervening pathways discussed above. Pathways 2086 can connect to similar pathways 1590 (FIG. 15) in frame 1572 to ultimately connect to external equipment (now shown). Pins 1058 may also include their own circuit components 2088 detectable by the remote equipment through the noted pathways.

Figure 23:
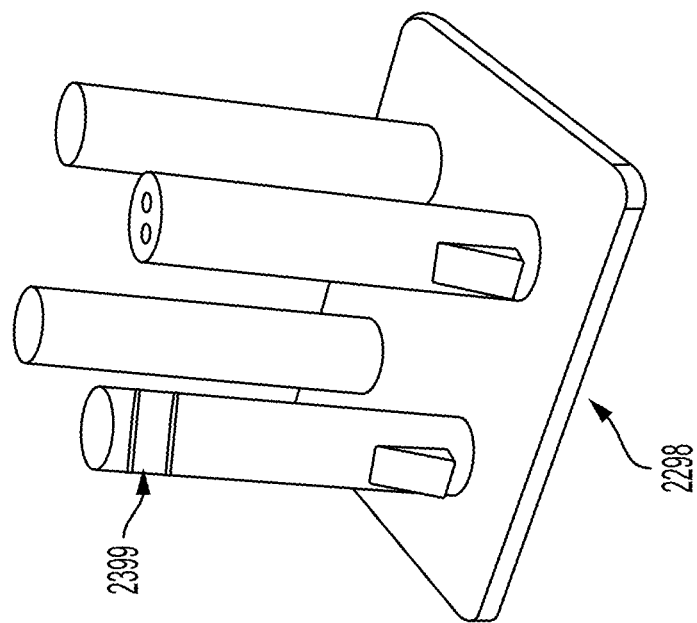
FIGS. 22 and 23 are perspective views of frame bridge connectors according to embodiments of the invention.
Figure 22:
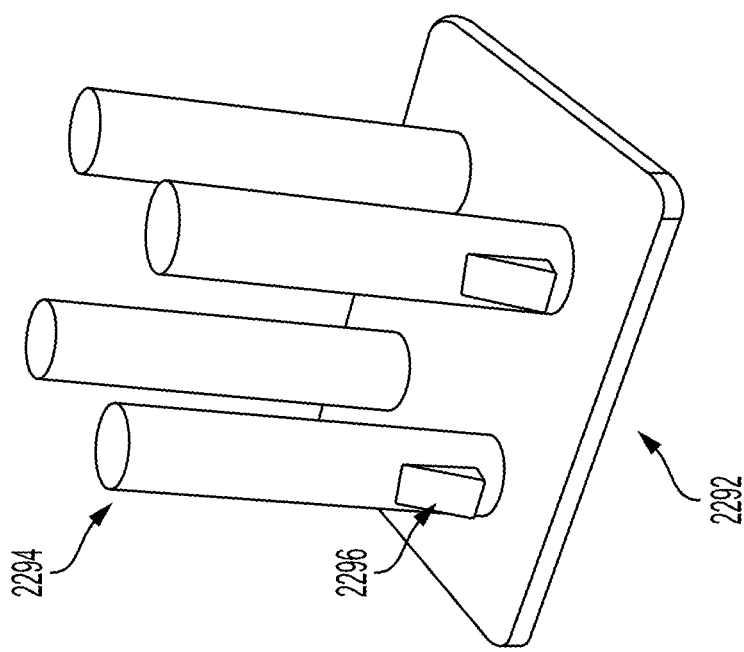
Figure 24:
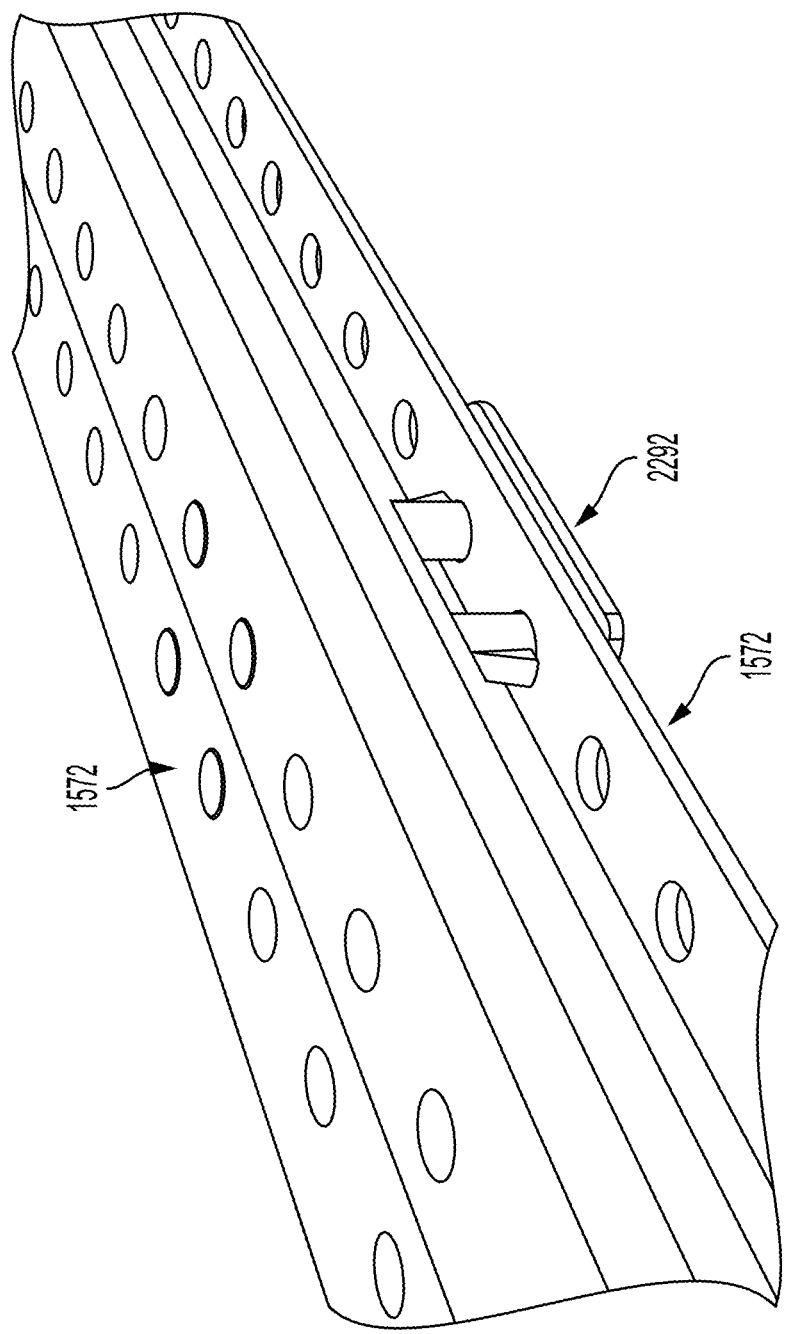
FIG. 24 is a perspective view of a frame bridge connector mounted on frame components according to an embodiment of the invention.

As noted above, embodiments of the assembled mounts can connect to adjacent frames 1572 of different solar panels. However, it may be desirable to provide such a connection through a component that is not mounted on the roof. Referring now to FIG. 22, a bridge mount 2292 is shown having four pins 2294 extending from a base with spring latches 2296 that provide such a connection. Referring now to FIG. 23, a bridge mount 2398 is shown which is the same as bridge mount 2292 save that pathways 2399 are provided to bridge the electrical pathways 1590 from one frame 1572 to an adjacent frame 1572; bridge mount 2398 may include its own circuit component (akin to 211 and 2088) and to facilitate detection as discussed herein. FIG. 24 shows bridge mount 2292 connecting two adjacent frames 1572.

Circuit component 211 may be a programmed integrated circuit or other form of hardware and/or software capable of transmitting an identification code. The various electrical pathways discussed herein, when established by proper connection of the structural components, connect circuit components 211 to remote equipment that can receive the identification code. The mere receipt of the identification code confirms that the intervening structural components have been properly installed, and the remote equipment can thus indicate/report on the confirmation of proper installation. Circuit component 211 may receive power from the solar panels, through a local battery, or from remote equipment.

Circuit component 211 may also be a passive device that requires no independent power, but which can impart its information by modulating other signals that react therewith. By way of example, circuit component 211 could be simply a conductive pathway or resistor, such that when an electrical pathway is created through compression washer 212 a circuit pathway is defined that between the remote equipment and the circuit component for which the remote component can detect activity, such as the flow of current.

Figure 25A:
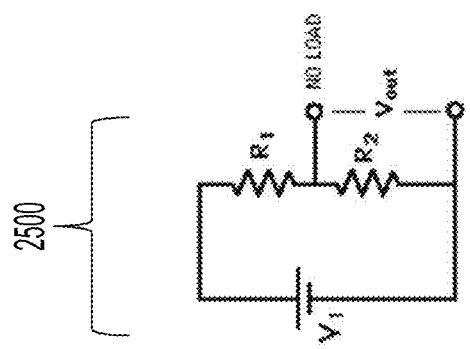
FIGS. 25A-25C show electrical diagrams of an embodiment of the invention.
Figure 25B:
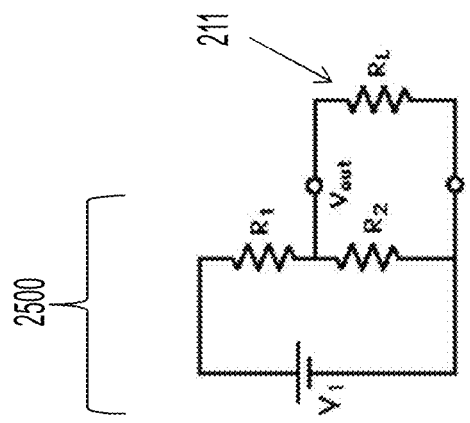

In another example, the passive circuit component can also change the configuration of the overall circuit connected to the remote equipment. FIGS. 25A and 25B show remote equipment including a voltage divider 2500, in which circuit component 211 is a resistor. If the intervening components are not properly installed as in FIG. 25A, then circuit component 211 is not part of the circuit and voltage divider 2500 will have a particular voltage Vout. If the intervening components are properly installed as in FIG. 25B, then Vout will change to a voltage consistent with the presence of a circuit component 211 as a resistor $R_L$. The level of voltage Vout is thus indicative of whether base 202 is properly installed on the surface and all other intervening components are properly connected.

Referring again to FIG. 18, several mounts 202 may be used to mount one or more objects such as solar panels, thus presenting multiple circuit components 211. If circuit components 211 are actively identifying themselves with unique identification codes, then the remote equipment can simply detect and distinguish them via the different identification codes. If the circuit components 211 are passive element such as resistors, than the circuit components will collectively form a circuit combination that would influence how they are detected.

Figure 25C:
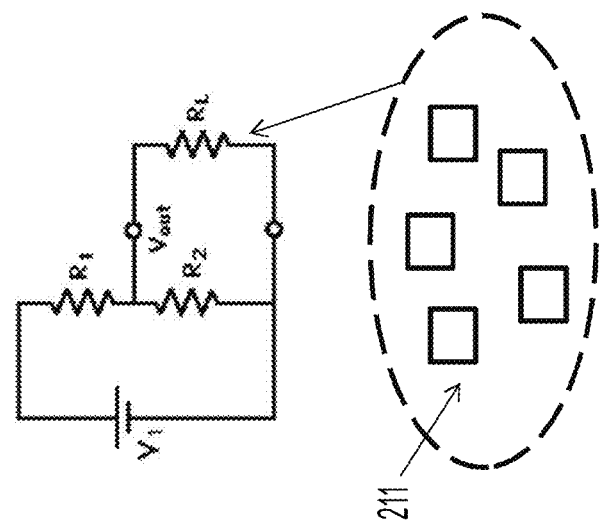

By way of non-limiting example in the voltage divider embodiment, in FIG. 25C the value of $R_L$ would be defined by the number and connections of multiple resistors 211, thereby resulting in different voltages Vout for those combinations. Different values/ranges of Vouts can be calculated in advance based upon the resistors with predetermined values in predetermined configurations, such that detection of a corresponding Vout is indicative of that combination. For example, a Vout of 2.5 v may be expected for 4 mounts 202, while a Vout of 2.8 v may be expected for 5 mounts 202. If the remote equipment detects a voltage of 2.5 v, then the equipment advises that 4 mounts 202 are detected; this may or may not match up with other data on the number of mounts, and action can be taken accordingly.

Figure 26:
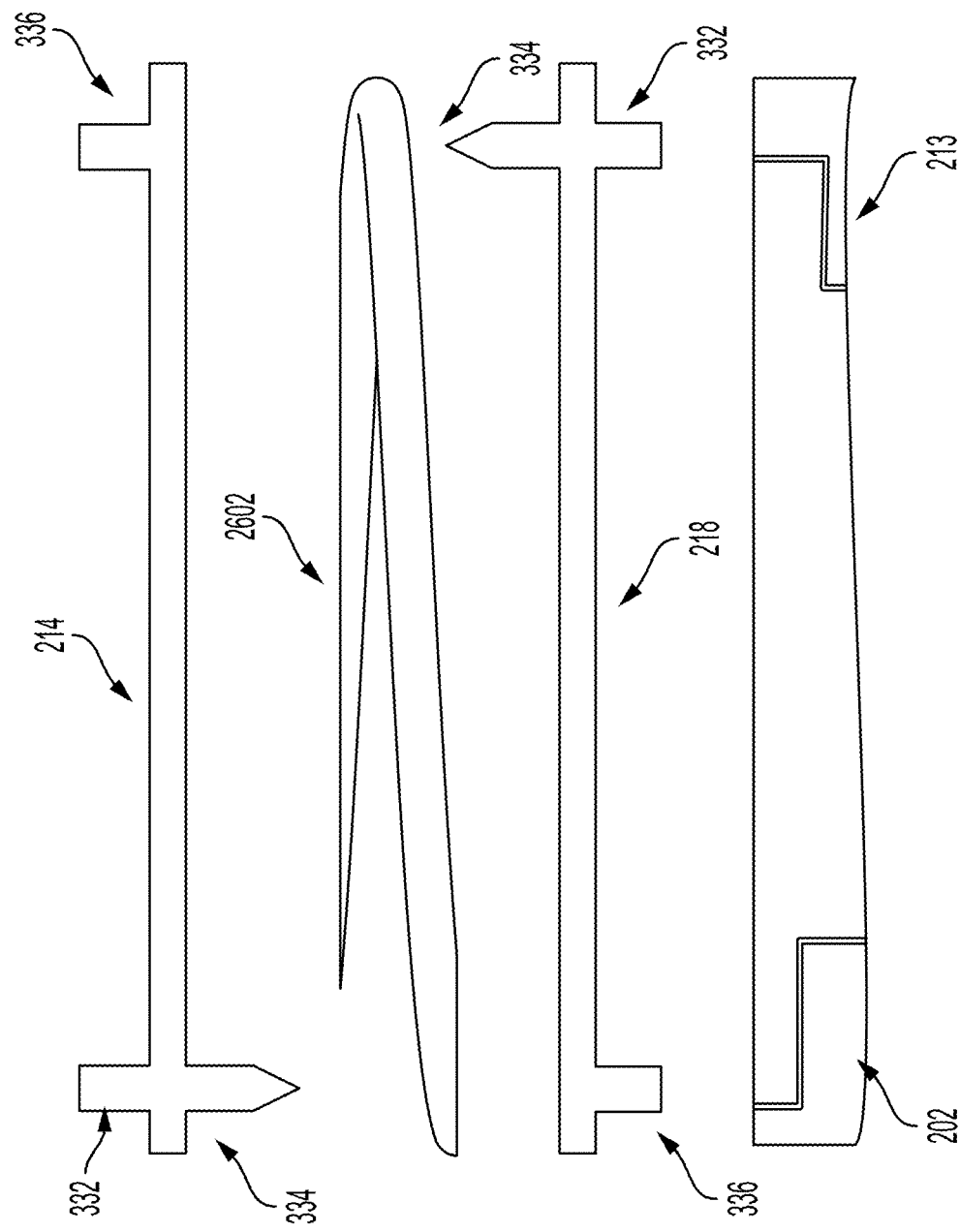
FIG. 26 shows another embodiment of the invention.

In the above embodiments, compressible washer 212 effectively acts as a switch to access the circuit component 211, with the switch being OFF when uncompressed and ON when compressed by the lag bolt. However, the invention is not limited to the particulars of the compressible washer 212 structure disclosed above, and other configurations that provide such switch functionality (uncompressed=OFF, compressed=ON) could be used. By way of non-limiting example, as shown in FIG. 26 a compressible coil spring 2602 whose height in the rest state creates a gap that separates the spikes 334 from connectors 336; when the lag bolt is inserted, the spring is compressed and the spikes 334 contact connectors 336 without actually piercing any component. A single spring layer could also be used with conductive pathways that extend in nubs slightly below the spring layer, but are not high enough in the rest state to reach both the electrical pathways in base 202 and cap 214; yet when compressed the nubs reach both sides and the electrical pathway is defined.

The above embodiments may be used without any circuit component 211 or corresponding electrical pathways, in which case the embodiments may be used solely as a physical mount of objects to a roof or other surface.

In another alternative, the pins 1058 may have the circuit components 2088 as in FIG. 21, while the lower mount components lack any circuitry and/or data pathways.

Figure 27:
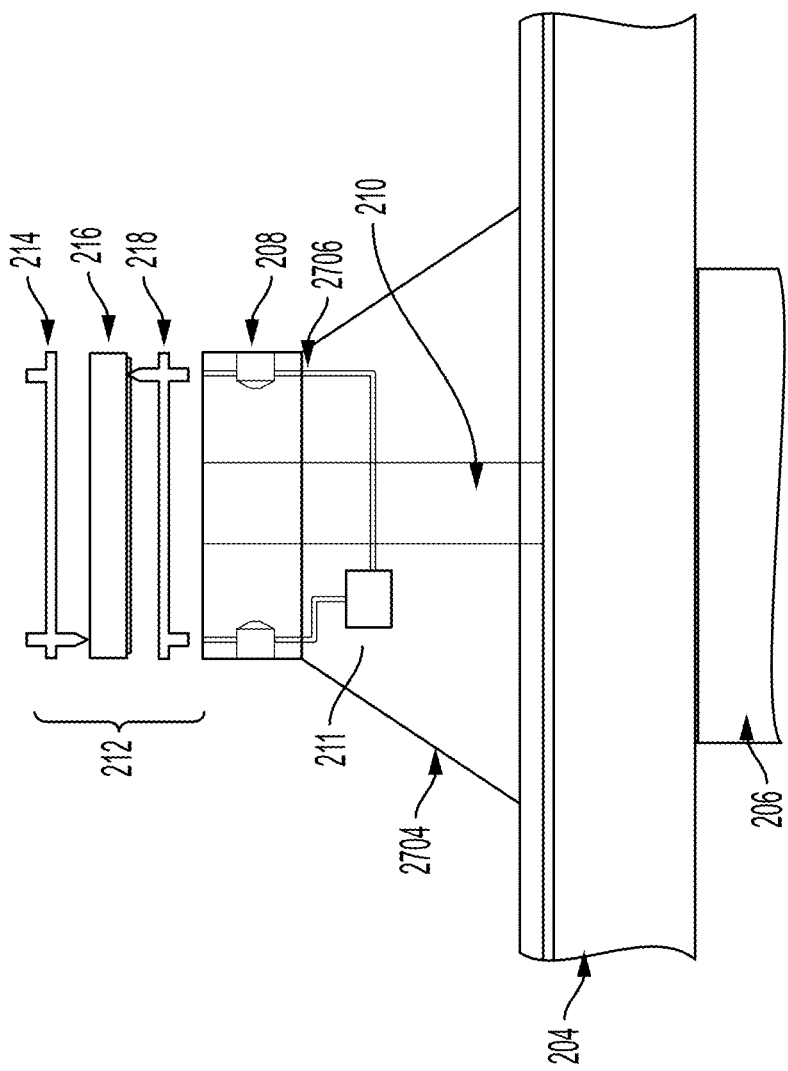
FIG. 27 is a side cross section view of mounting components according to another embodiment of the invention.

In base 202, the at least one electrical pathway 213 bypasses the holes 208. However, the invention is not so limited. Referring now to FIG. 27, an embodiment of a base 2704 is shown. Base 2704 may be identical to base 202, save that the at least one electrical pathway overlaps the base side hole 208 to define an open circuit; thus unlike the embodiment discussed above with respect to base 202, the circuit component will not be electrically assessable through the compression washer 212 absent additional components.

Referring now also back to FIG. 6, mounting of cap 540 and insertion of connector 648, which is preferably made of conductive material, into base side hole 208 and cap side hole 542 bridges the gap and allows access to the circuit component 211 inside base 2704. Detection of the presence of circuit component 211 as described above is thus further indicative that cap 540 has been properly mounted on base 2704 by connectors 648. If the cap is not properly mounted, such as by connector 648 not being fully inserted, then the open circuit will prevent circuit component 211 from being detected, which is indicative of improper mounting. Similarly, if the connector 648 is installed properly but the cap 540 is not (e.g., the connector 648 is installed first, which blocks cap 540 from sliding into proper position), then there would be a gap between the at least one data pathway 546 of cap 540 and the terminal ends 332 thereby created a different open circuit that would prevent detection of circuit component 211.

Figure 28:
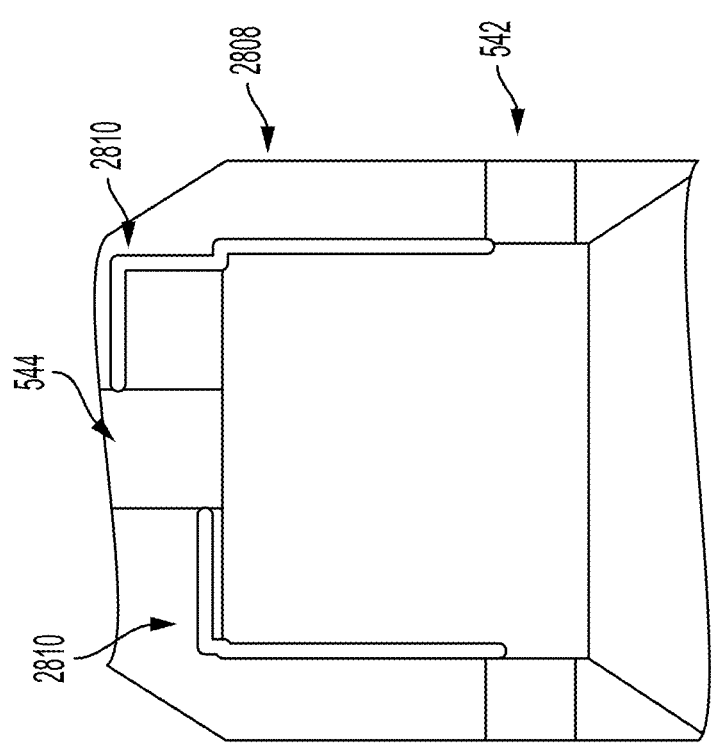
FIG. 28 is a cross section of a cap of mounting components according to another embodiment of the invention.

The layouts of the data pathways described herein is largely based on functionality and efficiency. If the intent is to allow data to pass from point A to point B, then the shortest path may be the simplest. However, the invention is not so limited, and other layouts may be used. By way of non-limiting example, in FIG. 28 a cap 2808 is similar to cap 540, although the at least one data pathway 2810 extends further down into cap 2808 for a different pathway layout.

Pin 1058 as discussed above is a solid pin of fixed height having a particular shape. However, the invention is not so limited, and any structure which achieves the mounting functionality may be used. By way of non-limiting example, the height of pin 1058 could be adjustable, to provide a Z-axis adjustability to complement the X and Y-axes adjustability provided by arms 1052.

Figure 29:
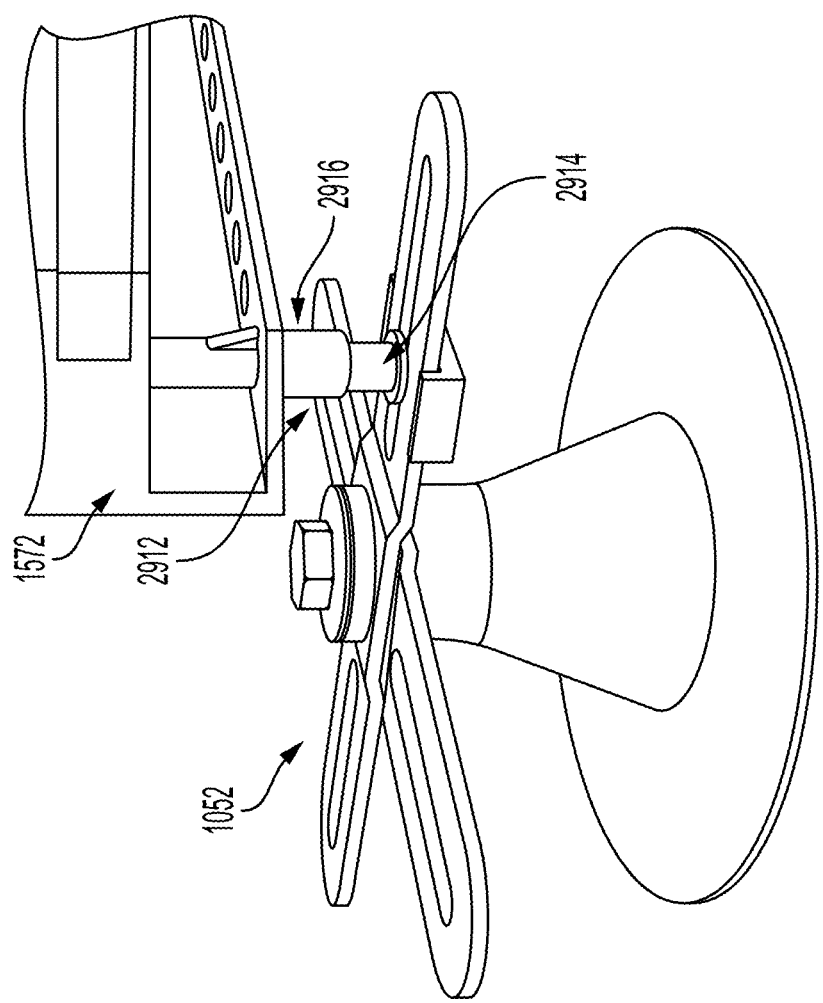
FIGS. 29 and 30 are perspective views of an assembled mounting structure supporting a frame component according to another embodiment of the invention.
Figure 30:
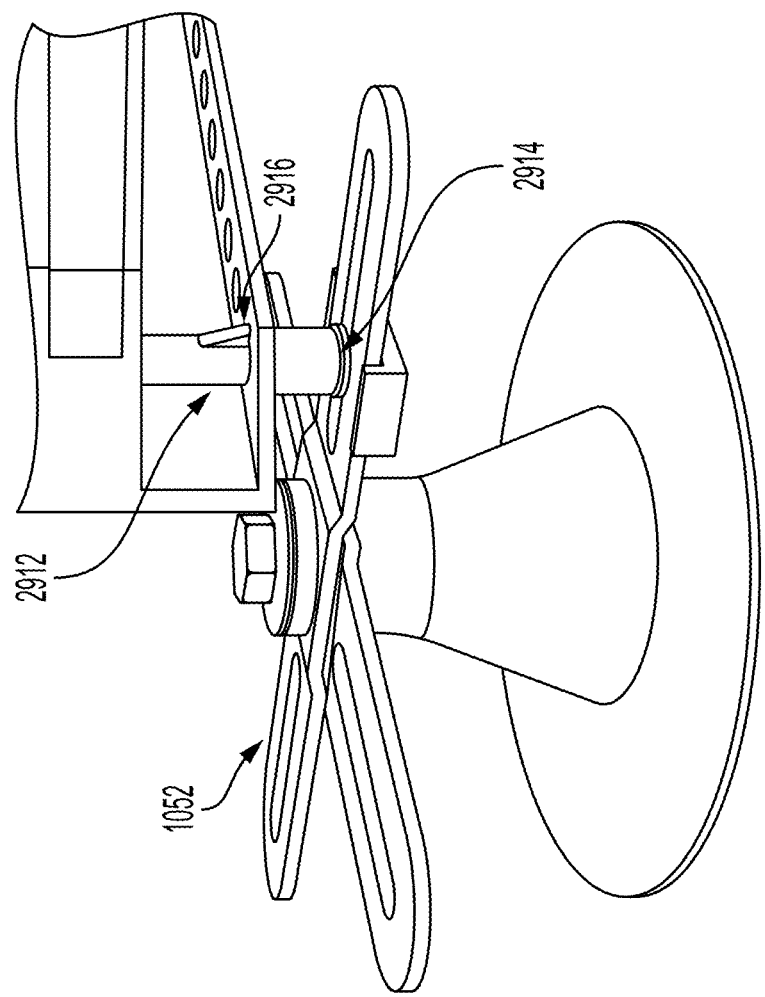

Referring now to FIGS. 29 and 30, a pin 2912 with adjustable height is shown. Pin 2912 includes a lower pin portion 2914 mounted on arm 1052 in the manner described with respect to pin 1058. An upper pin portion 2916 is sleeved on lower pin portion 2914, and can move up and down relative to lower pin portion 2914 to change the height of the frame 1572 relative to the underlying roof; lower pin portion 2194 is shown sleeved inside upper pin portion 2916, but the invention is not so limited and the relationship may be reversed. FIG. 29 shows a non-limiting example of an extended state of pin 2912 to provide a maximum height, and FIG. 30 shows a non-limiting example of a retracted state of pin 2912 to provide a minimum height.

There are a variety of methods to provide adjustable highest to pin 2912. A non-limiting example would be to provide mating threads on opposing surfaces of lower pin portion 2914 and upper pin portion 2916, such that height could be adjusted by rotating one relative to the other. Another non-limiting example would be the presence of hollow lateral holes in both lower pin portion 2914 and upper pin portion 2916, for which the height could be adjusted to a point of hole alignment and a lateral pin could be inserted to lock the two portions in place.

Figure 32:
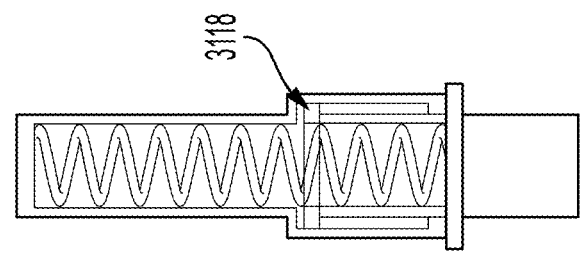
FIGS. 31 and 32 are side cross section views of a mounting pin according to an embodiment of the invention.
Figure 31:
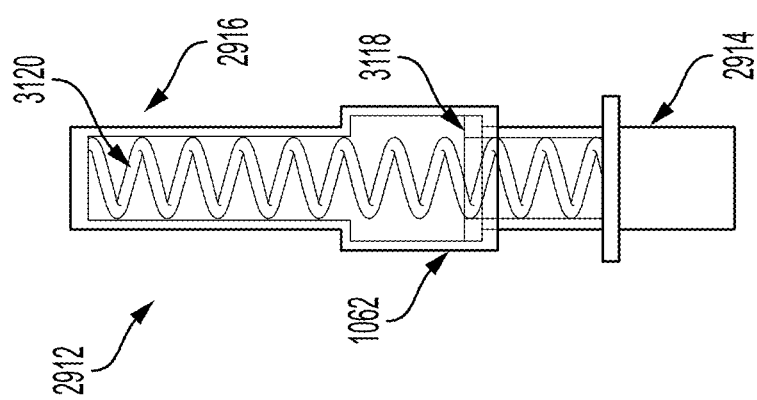

Referring now to FIGS. 31 and 32, the sleeve configuration of pin 2912 is shown. The larger diameters portion 1062 is hollow and accommodates a ledge 3120 of lower pin portion 2914; ledge 3120 is shown at the top of lower pin portion 2914 but this need not be the case. Engagement of ledge 3118 with the top/bottom of larger diameter section 1062 defines the upper/lower range of height adjustment of pin 2912. The height may be adjusted as noted above, for which FIGS. 31 and 32 show another non-limiting example of height adjustment via a spring 3120. Use of a spring 3120 renders the pin 2912 self-adjusting, as any particular pin 2912 supporting any particular frame 1572 will adjust to the appropriate height as dictated by different height needs of the array of solar panels.

As discussed above, the lag bolt may or may not have a head. FIG. 33 shows an embodiment in which a lag bolt 3322 without a head is used with compression washer 212. A nut 3324 rotates along the shaft of lag bolt 3322 applies downward pressure against compression washer 212 in the same manner as a head described above.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A mount for support of a component on a surface, comprising:
  a base, comprising:
    a bottom adapted to be supported on the surface;
    a circuit component;

a first data pathway extending from the circuit component;
a compressible component adapted to be mounted above the base and in electrical contact with the data pathway of the base, the compressible component having an uncompressed state in which the circuit component is not electrically accessible through the compressible component, and a compressed state in which a second data pathway is formed through the compressible component such that the first data pathway of the base is electrically accessible through the compressible component;
wherein the compressible component is adapted to transition from the uncompressed state to the compressed state in response to a lag bolt passing through the compressible component and base and applying sufficient downward pressure to secure the base to the surface;
wherein electrical access to the circuit component is an electrical indicator that the base has been installed onto the surface.

2. The mount of claim 1, wherein the lag bolt is either (a) an at least partially threaded rod with a head such that rotation of the rod causes the head to apply pressure against the compressible component, or (b) an at least partially threaded rod without a head in combination with a nut, wherein rotation of the nut rod causes the nut to apply pressure against the compressible component.

3. The mount of claim 1, further comprising:
the base including a side hole;
a cap with a top, a side hole, and a third data pathway;
the cap and base having a connected configuration in which the side hole of the base is aligned with the side hole of the cap and a connecter is inserted into the aligned side holes; and
wherein when at least the compressible component is in the compressed state and the base and cap are in the connected configuration the circuit component is electrically accessible through the first data pathway of the base, the second data pathway of the compressible component, and the third data pathway of the cap.

4. The mount of claim 3, further comprising:
a laterally extending arm adapted to mount on the top of the cap, and having a fourth data pathway;
a mounting pin adapted to extend from the arm, the mounting arm being adapted to receive the frame of an object to be supported, and having a fifth data pathway;
wherein when at least the compressible component is in the compressed state, the base and cap are in the connected configuration, the arm is mounted on the cap and the mounting pin is mounted on the arm, and the circuit component is electrically accessible through the mounting pin.

5. The mount of claim 4, wherein the arm has a laterally extending slot through which the mounting pin engages the arm such that the position of the mounting pin relative to the center of the arm is adjustable.

6. The mount of claim 4, wherein the arm comprises first and second arms that cross each other, the mounting pin on each of the first and second arms comprising first and second mounting pins mounted on opposite sides of each of the first and second arms.

7. A mount for support of a component on a surface, comprising:
a base comprising: a bottom adapted to be supported on the surface;
a central hole for receiving a lag bolt through the base to penetrate into the surface;
a side hole;
a cap mountable on the base, comprising:
a top with a central hole;
a side hole;
a lateral connector adapted to connect the side hole of the cap to the side hole of the base, thereby connecting the cap to the base;
an arm adapted to be mounted on the cap by a central pin through the central hole of the cap;
an off-center pin adapted to be mounted on the arm to extend away from the arm, the off-center pin having a support ledge;
wherein the mount is adapted to have an assembled state in which the base is mounted on the surface by the lag bolt, the cap is mounted on the base by the lateral connector, the arm is mounted on the cap by the central pin, and the off-center pin is mounted on the arm;
wherein when in the assembled state the mount is adapted to support a frame with a hole by sliding the hole of the frame over the off-center pin.

8. The mount of claim 7, wherein the pin has a spring latch adapted to lock the frame on the pin.

9. The mount of claim 7, wherein the arm is rotatable relative to the cap.

10. The mount of claim 9, wherein the surface of the top of the cap and the arm are scalloped to define fixed angular positions of the arm relative to the cap.

11. The mount of claim 7, wherein the arm has a laterally extending slot through which the off-center pin engages the arm such that the position of the mounting pin relative to the center of the arm is adjustable.

12. The mount of claim 7, wherein the arm comprises first and second arms that cross each other, the off-center pin on each of the first and second arms comprising first and second off-center pins mounted on opposite sides of each of the first and second arms.

13. A mount for support of a component on a surface, comprising:
a base, comprising:
a bottom adapted to be supported on the surface;
a circuit component;
a side hole;
a first data pathway extending from the circuit component to the side hole, and a second data pathway extending from the side hole to a surface of the base, the first and second data pathways being electrically disconnected when the side hole is empty and electrically connected when a connector is present in the side hole;
a compressible component adapted to be mounted above the base and in electrical contact with the second data pathway, the compressible component having an uncompressed state in which the circuit component is not electrically accessible through the compressible component, and a compressed state in which a third data pathway is formed through the compressible component such that the circuit component is electrically accessible through the compressible component when a connector is present in the side hole;
wherein the compressible component is adapted to transition from the uncompressed state to the compressed state in response to a lag bolt passing through the compressible component and base to secure the base to the surface;

wherein electrical access to the circuit component is an electrical indicator that the base has been installed onto the surface.

14. The mount of claim 13, wherein the lag bolt is either (a) an at least partially threaded rod with a head such that rotation of the rod causes the head to apply pressure against the compressible component, or (b) an at least partially threaded rod without a head in combination with a nut, wherein rotation of the nut rod causes the nut to apply pressure against the compressible component.

15. The mount of claim 13, further comprising:
the base including a side hole;
a cap with a top, a side hole, and a fourth data pathway;
the cap and base having a connected configuration in which the side hole of the base is aligned with the side hole of the cap and a connecter is inserted into the aligned side holes; and
wherein when at least the compressible component is in the compressed state and the base and cap are in the connected configuration the circuit component is electrically accessible through the first and second data pathways of the base, the connector, the third data pathway of the compressible component, and the fourth data pathway of the cap.

16. The mount of claim 15, further comprising:
a laterally extending arm adapted to mount on the top of the cap, and having a fifth data pathway;
a mounting pin adapted to extend from the arm, the mounting arm being adapted to receive the frame of an object to be supported, and having a sixth data pathway;
wherein when at least the compressible component is in the compressed state, the base and cap are in the connected configuration, the arm is mounted on the cap and the mounting pin is mounted on the arm, and the circuit component is electrically accessible through the mounting pin.

17. The mount of claim 16, wherein the arm has a laterally extending slot through which the mounting pin engages the arm such that the position of the mounting pin relative to the center of the arm is adjustable.

18. The mount of claim 16, wherein the arm comprises first and second arms that cross each other, the mounting pin on each of the first and second arms comprising first and second mounting pins mounted on opposite sides of each of the first and second arms.

19. A mount for support of a component on a surface, comprising:
a support including a bottom adapted to be supported on the surface and a receiving area configured to receive and support a mounting pin;
the mounting pin comprising:
a lower portion configured to engage the receiving area,
an upper portion configured to engage and support an object to be supported;
a circuit component;
a first data pathway extending from the circuit component to a position on the mounting pin that mates with a second data pathway on the object when the object is engaged and supported by the upper portion of the mounting pin;
wherein electrical access to the circuit component is an electrical indicator that the object is engaged and support by the upper portion of the mounting pin.

20. The mount of claim 1, wherein the mounting pin has a fixed height.

21. The mount of claim 1, wherein the mounting pin has an adjustable height.

* * * * *